US012435350B2

(12) United States Patent
Wei et al.

(10) Patent No.: US 12,435,350 B2
(45) Date of Patent: Oct. 7, 2025

(54) COMPLEX FOR SYNTHESIZING NUCLEOTIDE STRAND AND METHOD FOR SYNTHESIZING NUCLEOTIDE STRAND

(71) Applicants: SHANGHAI HONGENE BIOTECH CORPORATION, Shanghai (CN); SHANGHAI HONGENE BIOENGINEERING CO., LTD, Shanghai (CN)

(72) Inventors: Minzhi Wei, Shanghai (CN); Yisheng Zhang, Shanghai (CN); Liang Jiang, Shanghai (CN)

(73) Assignees: SHANGHAI HONGENE BIOTECH CORPORATION, Shanghai (CN); SHANGHAI HONGENE BIOENGINEERING CO., LTD, Shanghai (CN)

( * ) Notice: Subject to any disclaimer, the term of this patent is extended or adjusted under 35 U.S.C. 154(b) by 0 days.

(21) Appl. No.: 18/786,649

(22) Filed: Jul. 29, 2024

(65) Prior Publication Data
US 2025/0179548 A1  Jun. 5, 2025

(30) Foreign Application Priority Data

Nov. 30, 2023 (CN) .......................... 202311627360.X

(51) Int. Cl.
*C12P 19/34* (2006.01)
*C12N 9/00* (2006.01)

(52) U.S. Cl.
CPC ................ *C12P 19/34* (2013.01); *C12N 9/93* (2013.01); *C12Y 605/01001* (2013.01); *C12Y 605/01003* (2013.01)

(58) Field of Classification Search
CPC ... C12P 19/34; C12N 9/93; C12Y 605/01001; C12Y 605/01003
USPC ................ 435/6.1, 91.1, 91.31, 91.5, 91.52; 536/23.1, 25.3; 514/44 A, 44 R
See application file for complete search history.

(56) References Cited

U.S. PATENT DOCUMENTS 5,998,175 A   12/1999  Akhavan-Tafti
2009/0280538 A1   11/2009  Patel et al.

FOREIGN PATENT DOCUMENTS

| CA | 3191516 A1 * | 2/2023 | ........... C12Q 1/6855 |
|---|---|---|---|
| CN | 113439085 A | 9/2021 | |
| CN | 117757787 A | 3/2024 | |
| EP | 3929205 A1 * | 12/2021 | ............. C07H 21/02 |
| WO | 2020132316 A2 | 6/2020 | |
| WO | 2013074632 A1 | 5/2023 | |
| WO | WO-2023183948 A2 * | 9/2023 | ......... C12N 15/1031 |

OTHER PUBLICATIONS

Soheil Pourshahian, Therapeutic Oligonucleotides, Impurities, Degradants, and Their Characterization By Mass Spectrometry, Mass Spectrometry Reviews, 2019, pp. 1-35.

* cited by examiner

*Primary Examiner* — Jane J Zara
(74) *Attorney, Agent, or Firm* — Bayramoglu Law Offices LLC

(57) ABSTRACT

The present disclosure provides a complex for synthesizing one or more nucleotide strands of interest and a method for synthesizing one or more nucleotide strands of interest. The complex for synthesizing one or more nucleotide strands of interest includes nucleotide fragments and a double-stranded oligonucleotide ligase, wherein the nucleotide fragments are hybridized to form a double-stranded oligonucleotide; the double-stranded oligonucleotide ligase is a ligase capable of sealing nicks in the double-stranded oligonucleotide; and at least one strand of the double-stranded oligonucleotide is a nucleotide strand of interest; and the nucleotide fragments include a first fragment and a second fragment, the first fragment contains a 5'-phosphate group, and the first fragment is synthesized in a 3'- to 5'-direction; and the second fragment contains a 3'-hydroxyl group, and the second fragment is synthesized in a 5'- to 3'-direction.

20 Claims, No Drawings
Specification includes a Sequence Listing.

COMPLEX FOR SYNTHESIZING NUCLEOTIDE STRAND AND METHOD FOR SYNTHESIZING NUCLEOTIDE STRAND

CROSS-REFERENCE TO RELATED APPLICATION

The present disclosure claims the priority to the Chinese patent application with the filling No. 202311627360X filed with the Chinese Patent Office on Nov. 30, 2023, and entitled "Complex for Synthesizing Nucleotide Strand and Method for Synthesizing Nucleotide Strand", the contents of which are incorporated herein by reference in entirety.

SEQUENCE LISTING

The present application contains a Sequence Listing which has been submitted in XML format via EFS-Web and is hereby incorporated by reference in its entirety. Said XML copy is named GBCF065_Sequence_Listing_20240903.xml, created Sep. 3, 2024, and is 21,760 bytes in size.

TECHNICAL FIELD

The present disclosure relates to the technical field of nucleotide synthesis, and in particular, to a complex for synthesizing one or more nucleotide strands of interest and a method for synthesizing one or more nucleotide strands of interest.

BACKGROUND ART

At present, a nucleotide strand is generally synthesized by serially linking and extending nucleotide residues in sequence with 1 base at a time, so as to prepare a nucleotide strand of interest. Since the efficiency of a chemical synthesis reaction of the nucleotide strand cannot reach 100%, product purity and yield of a target product of synthesized nucleotide strands of interest both decrease with the increase of length of the nucleotide strands of interest, resulting in that a synthesized product contains a certain amount of non-target nucleotide strands whose length does not accord with that of the nucleotide strands of interest.

For nucleotide strands with a length less than or equal to 20 mer, after chemical synthesis thereof, a proportion of nucleotide strands of interest finally in a synthesized product can be increased by a purification process (for example, ion exchange column or reverse phase column). However, since the length of a part of the non-target nucleotide strands is relatively close to the length of the nucleotide strands of interest (for example, the length of the non-target nucleotide strands only differs from the length of the nucleotide strands of interest by 1 mer or 2 mer), these non-target nucleotide strands are quite close to the nucleotide strands of interest in property, so that these non-target nucleotide strands cannot be effectively separated or removed from the synthesized product. For nucleotide strands greater than 20 mer in length, particularly nucleotide strands greater than 50 mer in length, and even nucleotide strands greater than 100 mer in length, after chemical synthesis thereof, more non-target nucleotide strands cannot be effectively separated or removed from the synthesized product.

The presence of the non-target nucleotide strands in the synthesized product often affects function, activity, etc. of the nucleotide strands of interest, and particularly for cases where the nucleotide strands of interest are antisense strand drugs, RNAi drugs, nucleic acid aptamer drugs, sgRNA drugs, etc., the presence of the non-target nucleotide strands seriously affects the nucleotide strands of interest in exerting efficacy thereof.

SUMMARY

The present disclosure aims at providing a complex for synthesizing one or more nucleotide strands of interest and a method for synthesizing one or more nucleotide strands of interest. The present disclosure can reduce a content of non-target nucleotide strands in a synthesized product of the nucleotide strands, so as to improve purity of nucleotide strands of interest in the synthesized product.

In the first aspect, the present disclosure provides a complex for synthesizing one or more nucleotide strands of interest. The complex includes: nucleotide fragments and a double-stranded oligonucleotide ligase, wherein the nucleotide fragments are hybridized to form a double-stranded oligonucleotide; the double-stranded oligonucleotide ligase is a ligase capable of sealing nicks in the double-stranded oligonucleotide; and at least one strand of the double-stranded oligonucleotide is a nucleotide strand of interest; and the nucleotide fragments include a first fragment and a second fragment, the first fragment contains a 5'-phosphate group, and the first fragment is synthesized in a 3'- to 5'-direction; and the second fragment contains a 3'-hydroxyl group, and the second fragment is synthesized in a 5'- to 3'-direction.

In the complex for synthesizing one or more nucleotide strands of interest provided in the present disclosure, the nucleotide fragments have the first fragment synthesized in the 3'- to 5'-direction and containing the 5'-phosphate group, and the second fragment synthesized in the 5'- to 3'-direction and containing the 3'-hydroxyl group, and the first fragment and the second fragment can hybridze with each other and form the double-stranded oligonucleotide together, which can greatly reduce a content of non-target nucleotide strands in a synthesized product of nucleotide strands, so as to effectively improve purity of nucleotide strands of interest in the synthesized product, thereby being beneficial to fully exerting the efficacy of the nucleotide strands of interest.

In combination with the first aspect, in an optional embodiment of the present disclosure, the nucleotide fragments further include a third fragment, the third fragment contains a 3'-hydroxyl group, and the third fragment contains 5'-phosphate group.

Optionally, the third fragment is synthesized in the 3'- to 5'-direction; or, the third fragment is synthesized in the 5'- to 3'-direction.

In combination with the first aspect, in an optional embodiment of the present disclosure, the complex for synthesizing one or more nucleotide strands of interest further includes at least one template strand, the at least one template strand and the nucleotide fragments are hybridized to form the double-stranded oligonucleotide together; and the nucleotide fragments are hybridized to form the nucleotide strand of interest.

In combination with the first aspect, in an optional embodiment of the present disclosure, the template strand is of a straight-stranded structure; the template strand may be reversely complementary to a 5'-sequence of the first fragment, to form a first complementary region; the template strand may be reversely complementary to a 3'-sequence of the second fragment, to form a second complementary region; and the 5' end of the first fragment and the 3' end of the second fragment may form the nick therebetween.

In the above technical solutions, the template strand and the nucleotide fragments may form the double-stranded oligonucleotide together, and the nucleotide fragments may form the nucleotide strand of interest.

In combination with the first aspect, in an optional embodiment of the present disclosure, the template strand is of a hairpin structure; the template strand may be reversely complementary to a 5'-sequence of the first fragment, to form a first complementary region; and the template strand may be reversely complementary to a 3'-sequence of the second fragment, to form a second complementary region. The at least one template strand contains 5'-phosphate group, and the 5' end of the template strand and the 3' end of the first fragment may form the nick therebetween; or the at least one template strand contains a 3'-hydroxyl group, and the 3' end of the template strand and the 5' end of the second fragment may form the nick therebetween.

In the above technical solution, the template strand and the nucleotide fragments may form the double-stranded oligonucleotide together, and the nucleotide fragments may form the nucleotide strand of interest.

In combination with the first aspect, in an optional embodiment of the present disclosure, the first fragment is of a hairpin structure; the first fragment may be reversely complementary to a 3'-sequence of the second fragment, and the 5' end of the first fragment and the 3' end of the second fragment may form the nick therebetween; and a nucleotide strand that the first fragment links to the second fragment is the nucleotide strand of interest. Alternatively, the second fragment is of a hairpin structure; the second fragment may be reversely complementary to a 5'-sequence of the first fragment, and the 3' end of the second fragment and the 5' end of the first fragment may form the nick therebetween; and a nucleotide strand that the first fragment links to the second fragment is the nucleotide strand of interest.

In the above technical solutions, the first fragment and the second fragment may form the double-stranded oligonucleotide together, and the first fragment and the second fragment may form the nucleotide strand of interest after being linked.

In combination with the first aspect, in an optional embodiment of the present disclosure, the template strand has at least two template fragments, the template fragments are of a straight-stranded structure, and the at least two template fragments may form the nick therebetween; the template strand may be reversely complementary to a 5'-sequence of the first fragment, to form a first complementary region; the template strand may be reversely complementary to a 3'-sequence of the second fragment, to form a second complementary region; the 5' end of the first fragment and the 3' end of the second fragment may form the nick therebetween; and the nucleotide fragments are hybridized to form the nucleotide strand of interest.

In the above technical solution, the template strand and the nucleotide fragments may form the double-stranded oligonucleotide together, and the nucleotide fragments may form the nucleotide strand of interest.

Optionally, the template fragments include one fourth fragment and one fifth fragment; the fourth fragment contains 5'-phosphate group, and the fourth fragment is synthesized in a 3'- to 5'-direction; a fifth fragment contains a 3'-hydroxyl group, and the fifth fragment is synthesized in a 5'- to 3'-direction; the 5' end of the fourth fragment and the 3' end of the fifth fragment form the nick therebetween; and the 5' end of the first fragment and the 3' end of the second fragment form the nick therebetween.

In combination with the first aspect, in an optional embodiment of the present disclosure, the nucleotide fragments further include a sixth fragment and a seventh fragment; the sixth fragment contains a 5'-phosphate group, and the sixth fragment is synthesized in a 3'- to 5'-direction; and the seventh fragment contains a 3'-hydroxyl group, and the seventh fragment is synthesized in a 5'- to 3'-direction. The 5' end of the sixth fragment and the 3' end of the seventh fragment form the nick therebetween, and the sixth fragment and the seventh fragment form a first nucleotide strand of interest. The 5' end of the first fragment and the 3' end of the second fragment form the nick therebetween, and the first fragment and the second fragment form a second nucleotide strand of interest. The first nucleotide strand of interest and the second nucleotide strand of interest are hybridized to form the double-stranded oligonucleotide together.

In the above technical solution, the sixth fragment and the seventh fragment form the first nucleotide strand of interest, and the first fragment and the second fragment can form the second nucleotide strand of interest, which can further effectively reduce the content of non-target nucleotide strands in the synthesized product of the nucleotide strands, so as to further effectively improve the purity of the nucleotide strands of interest in the synthesized product, thereby being beneficial to fully exerting the efficacy of the nucleotide strands of interest.

In combination with the first aspect, in an optional embodiment of the present disclosure, the nucleotide fragments further include a sixth fragment and a seventh fragment; the sixth fragment contains a 5'-phosphate group, and the sixth fragment is synthesized in a 3'- to 5'-direction; and the seventh fragment contains a 3'-hydroxyl group, and the seventh fragment is synthesized in a 5'- to 3'-direction. The 5' end of the sixth fragment and the 3' end of the seventh fragment form the nick therebetween, and the sixth fragment and the seventh fragment form a first nucleotide strand of interest; the 3' end of the third fragment and the 5' end of the first fragment form the nick therebetween, and the 5' end of the third fragment and the 3' end of the second fragment form the nick therebetween; and the first fragment, the third fragment, and the second fragment are hybridized to form a second nucleotide strand of interest. The first nucleotide strand of interest and the second nucleotide strand of interest are hybridized to form the double-stranded oligonucleotide together.

In the above technical solution, the sixth fragment and the seventh fragment form the first nucleotide strand of interest, the first fragment, the third fragment, and the second fragment may form the second nucleotide strand of interest, which can further effectively reduce the content of non-target nucleotide strands in the synthesized product of the nucleotide strands, so as to further effectively improve the purity of the nucleotide strands of interest in the synthesized product, thereby being beneficial to fully exerting the efficacy of the nucleotide strands of interest.

In combination with the first aspect, in an optional embodiment of the present disclosure, when the nucleotide fragments are DNA, the double-stranded oligonucleotide ligase is a DNA double-stranded oligonucleotide ligase; the DNA double-stranded oligonucleotide ligase includes a T4 DNA ligase; when the nucleotide fragments are RNA, the double-stranded oligonucleotide ligase is an RNA double-stranded oligonucleotide ligase; and the RNA double-stranded oligonucleotide ligase includes an Rnl2 family ligase and an Rnl5 family ligase; or/and, the nucleotide fragments contain 4~200 bases; or/and, the complex for synthesizing a nucleotide strand further includes a buffer solution containing magnesium ions.

Optionally, the nucleotide fragments contain 4~120 bases.

In combination with the first aspect, in an optional embodiment of the present disclosure, the nucleotide fragments contain a modifying group or is free of modifying group; or/and, the at least one template strand contains a modifying group or is free of modifying group.

In combination with the first aspect, in an optional embodiment of the present disclosure, a method for preparing the template strand includes: performing reactions of synthesizing the template strand according to a sequence of interest, without purification treatment of a synthesized product; or/and, a method for preparing the nucleotide fragments includes: performing reactions of synthesizing the nucleotide fragments according to a sequence of interest, without purification treatment of a synthesized product.

In the above technical solution, even if the purification treatment is not performed after the template strand and the nucleotide fragments are synthesized, a content of non-target nucleotide strands in the synthesized product of the nucleotide strands also can be greatly reduced, so as to further effectively improve the purity of the nucleotide strands of interest in the synthesized product, thereby being beneficial to fully exerting the efficacy of the nucleotide strands of interest.

In the second aspect, the present disclosure provides a method for synthesizing one or more nucleotide strands of interest, including: performing a ligation reaction to synthesize the nucleotide strand of interest by using the complex according to any one of the first aspect above.

For the method for synthesizing a nucleotide strand provided in the present disclosure, since synthesis raw materials have the first fragment synthesized in the 3'- to 5'-direction and containing the 5'-phosphate group" and the second fragment synthesized in the 5'- to 3'-direction and containing the 3'-hydroxyl group, and the first fragment and the second fragment can hybridze with each other and form the double-stranded oligonucleotide together, the content of non-target nucleotide strands in the synthesized product of nucleotide strands can be greatly reduced, so as to effectively improve the purity of nucleotide strands of interest in the synthesized product, thereby being beneficial to fully exerting the efficacy of the nucleotide strands of interest.

DETAILED DESCRIPTION OF EMBODIMENTS

In the present disclosure, a nucleotide strand refers to a polymer formed by polycondensation of 2 or more nucleotide monomers by phosphodiester bonds. The phosphodiester bond is generally a bond formed by esterification of a hydroxyl group on 3' carbon of a nucleoside sugar ring with 5' phosphate of another nucleoside monomer. In the present disclosure, the nucleotide strand refers to a nucleotide strand that may have 100 bases or less, 200 bases or less, or 500 bases or less. The present disclosure does not limit the specific number of bases in the nucleotide strand.

In the present disclosure, "synthesis in a 3'- to 5'-direction" means that nucleotide fragments are synthesized in a direction from 3' end of the nucleotide fragments to 5' end of the nucleotide fragments; and "synthesis in a 5'- to 3'-direction" means that nucleotide fragments are synthesized in a direction from 5' end of the nucleotide fragments to 3' end of the nucleotide fragments.

In the present disclosure, for a mode of synthesizing in the 3'- to 5'-direction, n−1 impurity refers to a nucleotide product with deletion of 1 base relative to a 5' end of a target synthesized product, n−2 impurity refers to a nucleotide product with deletion of 2 bases relative to the 5' end of the target synthesized product, n−3 impurity refers to a nucleotide product with deletion of 3 bases relative to the 5' end of the target synthesized product, n−x impurity refers to a nucleotide product with deletion of x bases relative to the 5' end of the target synthesized product, n+1 impurity refers to a nucleotide product having 1 more base relative to the 5' end of the target synthesized product, and n+2 impurity refers to a nucleotide product having 2 more bases relative to the 5' end of the target synthesized product.

In the present disclosure, for a mode of synthesizing in the 5'- to 3'-direction, n−1 impurity refers to a nucleotide product with deletion of 1 base relative to a 3' end of a target synthesized product, n−2 impurity refers to a nucleotide product with deletion of 2 bases relative to the 3' end of the target synthesized product, n−3 impurity refers to a nucleotide product with deletion of 3 bases relative to the 3' end of the target synthesized product, n−x impurity refers to a nucleotide product with deletion of x bases relative to the 3' end of the target synthesized product, n+1 impurity refers to a nucleotide product having 1 more base relative to the 3' end of the target synthesized product, and n+2 impurity refers to a nucleotide product having 2 more bases relative to the 3' end of the target synthesized product.

In the present disclosure, a template strand refers to a nucleotide strand that is reversely complementary to a nucleotide fragment partially or completely. The template strand may be a DNA strand or an RNA strand, and may or may not contain a modifying group.

In the present disclosure, a double-stranded oligonucleotide refers to a double-stranded DNA with sequences reversely complementary, a double-stranded RNA with sequences reversely complementary, or a double-stranded oligonucleotide formed by a single-stranded RNA and a single-stranded DNA with sequences reversely complementary.

In the present disclosure, that at least one strand of the double-stranded oligonucleotide is target nucleotide means that two nucleotide strands with sequences reversely complementary both may be nucleotide strands of interest, and it is also feasible that only one of the two is a nucleotide strand of interest.

In the present disclosure, a nick refers to a position lacking a phosphodiester bond between two adjacent nucleotide units (which may be nucleotide fragments or template strands) in a double-stranded oligonucleotide. An intact phosphodiester bond may be formed by catalyzing the nick with a double-stranded oligonucleotide ligase, i.e., an intact phosphodiester bond is formed by catalyzing a 3'-hydroxyl group of one nucleotide unit at the nick and a 5'-phosphate group of the other nucleotide unit at the nick by the double-stranded oligonucleotide ligase.

In the present disclosure, nick sealing refers to a process of forming an intact phosphodiester bond at a nick between two adjacent nucleotide units in a double-stranded oligonucleotide.

In the present disclosure, a phosphorylation donor refers to a nucleotide unit (which may be a nucleotide fragment or a template strand) containing a 5'-phosphate group; and a hydroxyl receptor refers to a nucleotide unit (which may be a nucleotide fragment or a template strand) containing a 3'-hydroxyl group. The 5'-phosphate group of the phosphorylation donor and the 3'-hydroxyl group of the hydroxyl receptor may form an intact phosphodiester bond under catalysis of a double-stranded oligonucleotide ligase. The phosphorylation donor may be a modifying phosphorylation donor, for example, may be thio, halogenated, etc.

In the present disclosure, the double-stranded oligonucleotide ligase refers to an enzyme having a ligation function on a nick in a double-stranded oligonucleotide, i.e., an enzyme that can make an intact phosphodiester bond form at the nick in the double-stranded oligonucleotide.

A nucleotide strand is generally synthesized by serially linking and extending nucleotide residues in sequence with 1 base at a time, so as to prepare a nucleotide strand of interest, while the efficiency of a chemical synthesis reaction of the nucleotide strand cannot reach 100%.

For synthesis of DNA strands on the principle of phosphoramidite, efficiency of each base for synthesizing the DNA strands is approximately 99.0%~99.6%. Calculated by a median 99.3% thereof, for synthesizing DNA strands with a length of 10 mer, a content of target DNA strands in a synthesized product accounts for 93%; for synthesizing DNA strands with a length of 20 mer, the content of the target DNA strands in a synthesized product accounts for 87%; for synthesizing DNA strands with a length of 40 mer, a content of the target DNA strands in a synthesized product accounts for 76%; and for synthesizing the DNA strands with a length of 80 mer, a content of the target DNA strands in a synthesized product accounts for 57%. For synthesis of RNA strands on the principle of phosphoramidite, efficiency of each base for synthesizing the RNA strands is approximately 98.0%. For synthesizing RNA strands with a length of 10 mer, a content of target RNA strands in a synthesized product accounts for 82%; for synthesizing RNA strands with a length of 20 mer, a content of target RNA strands in a synthesized product accounts for 67%; for synthesizing RNA strands with a length of 40 mer, a content of target RNA strands in a synthesized product accounts for 45%; and for synthesizing RNA strands with a length of 80 mer, a content of the target RNA strands in a synthesized product accounts for 20%.

In addition to the nucleotide strand of interest (i.e., full-length product), non-target nucleotide strand (i.e., non-full-length product, i.e., non-target nucleotide strand with a length not in line with the nucleotide strand of interest) is usually non-full-length truncated nucleotide fragments such as the n−1 impurity, the n−2 impurity, and the n−3 impurity, and a small amount of the n+1 impurity and the n+2 impurity.

For nucleotide strands with a length less than or equal to 20 mer, after chemical synthesis thereof, a proportion of the nucleotide strands of interest finally in the synthesized product can be increased by a purification process (for example, ion exchange column or reverse phase column). However, the n−1 impurity and the n−2 impurity in the synthesized product, due to their properties quite close to that of the nucleotide strand of interest, cannot be effectively separated or removed from the synthesized product. While for nucleotide strands greater than 20 mer in length, particularly nucleotide strands greater than 50 mer in length, and even nucleotide strands greater than 100 mer in length, after chemical synthesis thereof, in addition to the n−1 impurity, the n−2 impurity, the n+1 impurity, and the n+2 impurity that cannot be effectively separated or removed from the synthesized product, n−3 impurity, n−4 impurity, n−5 impurity, and even n−6 impurity, n−7 impurity, n−8 impurity, n−9 impurity, n−10 impurity or longer truncated nucleotide fragments cannot be effectively separated or removed from the synthesized product. The presence of the non-target nucleotide strands in the synthesized product often affects function, activity, etc. of the nucleotide strands of interest, and particularly for cases where the nucleotide strands of interest are antisense strand drugs, RNAi drugs, nucleic acid aptamer drugs, sgRNA drugs, etc., the presence of the non-target nucleotide strands seriously affects the nucleotide strands of interest in exerting efficacy thereof.

To this end, the present disclosure provides a complex for synthesizing a nucleotide strand. The complex includes: nucleotide fragments and a double-stranded oligonucleotide ligase, wherein the nucleotide fragments are hybridized to form a double-stranded oligonucleotide; the double-stranded oligonucleotide ligase is a ligase that can seal nicks in the double-stranded oligonucleotide; and at least one strand of the double-stranded oligonucleotide is a nucleotide strand of interest. The nucleotide fragments include a first fragment and a second fragment. The first fragment contains a 5'-phosphate group, and the first fragment is synthesized in a 3'- to 5'-direction. The second fragment contains a 3'-hydroxyl group, and the second fragment is synthesized in a 5'- to 3'-direction.

In the complex for synthesizing a nucleotide strand provided above, the nucleotide fragments have "the first fragment synthesized in the 3'- to 5'-direction and containing the 5'-phosphate group" and "the second fragment synthesized in the 5'- to 3'-direction and containing the 3'-hydroxyl group". In a process of conducting a synthesis reaction of the nucleotide strand using the complex for synthesizing a nucleotide strand provided above, the first fragment serves as a phosphorylation donor, the second fragment serves as a hydroxyl receptor, the nucleotide fragments containing the first fragment and the second fragment may form the double-stranded oligonucleotide, the nick can be generated in the double-stranded oligonucleotide, and the nicks can be sealed under catalysis of the double-stranded oligonucleotide ligase, to complete the synthesis reaction of the nucleotide strand of interest. The above synthesis reaction can greatly reduce a content of non-target nucleotide strands (particularly n−1 impurity, n−2 impurity, n+1 impurity, and n+2 impurity) in a synthesized product of the nucleotide strands, so as to effectively improve purity of the nucleotide strands of interest in the synthesized product, thereby being beneficial to fully exerting the efficacy of the nucleotide strands of interest.

It can be understood that when the nucleotide fragments are DNA, the double-stranded oligonucleotide ligase for sealing nicks is a DNA double-stranded oligonucleotide ligase; and when the nucleotide fragments are RNA, the double-stranded oligonucleotide ligase for sealing nicks is an RNA double-stranded oligonucleotide ligase.

It can be understood that the first fragment and the second fragment both may be DNAs, the first fragment and the second fragment both may be RNAs the first fragment may be DNA and the second fragment may be RNA, or the first fragment may be RNA and the second fragment may be DNA, as long as the first fragment and the second fragment form the double-stranded oligonucleotide together.

In some optional embodiments of the present disclosure, in addition to the foregoing first fragment and second fragment, the nucleotide fragments further may include a third fragment, of which a 3' end contains a hydroxyl group, and a 5' end contains a phosphate group.

When the nucleotide fragments include the first fragment, the second fragment, and the third fragment at the same time, the first fragment, the second fragment, and the third fragment are hybridized to form the double-stranded oligonucleotide together, which also can substantially reduce the content of the non-target nucleotide strands (particularly the n−1 impurity, the n−2 impurity, the n+1 impurity, and the n+2 impurity) in the synthesized product of the nucleotide strands, so as to effectively improve the purity of the nucleotide strands of interest in the synthesized product, further being beneficial to fully exerting the efficacy of the nucleotide strands of interest.

Further, in some optional embodiments of the present disclosure, the third fragment is synthesized in the 3'- to 5'-direction; or, the third fragment is synthesized in the 5'- to 3'-direction. When the nucleotide fragments simultaneously include the first fragment, the second fragment, and the third fragment, either synthesizing the third fragment in the 3'- to 5'-direction or in the 5'- to 3'-direction can substantially reduce the content of the non-target nucleotide strands (particularly the n−1 impurity, the n−2 impurity, the n+1 impurity, and the n+2 impurity) in the synthesized product of the nucleotide strands, so as to effectively improve the purity of the nucleotide strands of interest in the synthesized product, further being beneficial to fully exerting the efficacy of the nucleotide strands of interest.

In some optional embodiments of the present disclosure, the nucleotide fragments further may have other fragments, as long as the nucleotide fragments have at least one first fragment and at least one second fragment, and all fragments of the nucleotide fragments may form the double-stranded oligonucleotide together, which can substantially reduce the content of the non-target nucleotide strands (particularly the n−1 impurity, the n−2 impurity, the n+1 impurity, and the n+2 impurity) in the synthesized product of the nucleotide strands, so as to effectively improve the purity of the nucleotide strands of interest in the synthesized product, further being beneficial to fully exerting the efficacy of the nucleotide strands of interest.

In some optional embodiments of the present disclosure, the complex for synthesizing a nucleotide strand further includes at least one template strand, wherein the at least one template strand and the nucleotide fragments (i.e., the first fragment and the second fragment) are hybridized to form the double-stranded oligonucleotide together; and the nucleotide fragments are hybridized to form the nucleotide strands of interest.

In some optional embodiments of the present disclosure, the at least one template strand is of a straight-stranded structure. The template strand may be reversely complementary to a 5'-sequence of the first fragment, to form a first complementary region. The template strand may be reversely complementary to a 3'-sequence of the second fragment, to form a second complementary region; and the 5' end of the first fragment and the 3' end of the second fragment may form a nick therebetween. In the above mode, it can be realized that the template strand and the nucleotide fragments may form the double-stranded oligonucleotide together, and the nucleotide fragments may form the nucleotide strands of interest.

Exemplarily, when "the nucleotide fragments only include the foregoing first fragment and second fragment, and the at least one template strand is of a straight-stranded structure", a 5' end of the template strand may be reversely complementary to a 5'-sequence of the first fragment, to form the first complementary region. A 3' end of the template strand may be reversely complementary to a 3'-sequence of the second fragment, to form the second complementary region. The 5'-phosphate group of the first fragment and the 3'-hydroxyl group of the second fragment form the nick therebetween. The first fragment, the second fragment, and the template strand form the double-stranded oligonucleotide together. The first fragment and the second fragment form the nucleotide strand of interest together. The nick between the first fragment and the second fragment may be sealed under a catalytic effect of a double-stranded oligonucleotide ligase, thus forming an intact phosphodiester bond, and thereby completing the synthesis reaction of the nucleotide strands of interest.

Exemplarily, when "the nucleotide fragments simultaneously include the foregoing first fragment, second fragment, and third fragment, and the at least one template strand is of a straight-stranded structure", the 5' end of the template strand may be reversely complementary to the 5'-sequence of the first fragment, to form the first complementary region; the 3' end of the template strand may be reversely complementary to the 3'-sequence of the second fragment, to form the second complementary region; and a middle region (i.e., a region between the 3' end and the 5' end) of the template strand may be reversely complementary to the third fragment, to form a third complementary region. The 5'-phosphate group of the first fragment and the 3'-hydroxyl group of the third fragment form the nick therebetween, and the 5'-phosphate group of the third fragment and the 3'-hydroxyl group of the second fragment form the nick therebetween. The first fragment, the second fragment, the third fragment, and the template strand form the double-stranded oligonucleotide together. The first fragment, the second fragment, and the third fragment form the nucleotide strands of interest. The nick between the first fragment and the third fragment and the nick between the second fragment and the third fragment both may be sealed under a catalytic effect of a double-stranded oligonucleotide ligase, thus forming an intact phosphodiester bond, and thereby completing the synthesis reaction of the nucleotide strands of interest.

In some optional embodiments, the at least one template strand is of a hairpin structure. The template strand may be reversely complementary to the 5'-sequence of the first fragment, to form the first complementary region. The template strand may be reversely complementary to the 3'-sequence of the second fragment, to form the second complementary region. The at least one template strand contains a 5'-phosphate group, and the 5' end of the template strand and the 3' end of the first fragment may form the nick therebetween, or the at least one template strand contains a 3'-hydroxyl group, and the 3' end of the template strand and the 5' end of the second fragment may form the nick therebetween. In the above mode, it can be realized that the template strand and the nucleotide fragments can form the double-stranded oligonucleotide together, and the nucleotide fragments may form the nucleotide strands of interest.

Exemplarily, when "the nucleotide fragments only include the foregoing first fragment and second fragment, and the at least one template strand is of a hairpin structure", there are two instances as follows:

Instance 1: the template strand may be reversely complementary to a 5'-sequence of the first fragment, to form the first complementary region, the template strand may be reversely complementary to a 3'-sequence of the second fragment, to form the second complementary region, the 5'-phosphate group of the first fragment and the 3'-hydroxyl group of the second fragment form the nick therebetween. The at least one template strand contains a 5'-phosphate group, and the 5'-phosphate group of the template strand and the 3'-hydroxyl group of the first fragment form the nick therebetween. The first fragment, the second fragment, and the template strand form the double-stranded oligonucleotide together. The first fragment and the second fragment form the nucleotide strand of interest. The nick between the first fragment and the second fragment and the nick between the first fragment and the template strand both may be sealed under a catalytic effect of a double-stranded oligonucleotide ligase, thus forming an intact phosphodiester bond, and thereby completing a synthesis reaction of the nucleotide strand of interest.

Instance 2: the template strand may be reversely complementary to a 5'-sequence of the first fragment, to form the first complementary region, the template strand may be reversely complementary to a 3'-sequence of the second fragment, to form the second complementary region, the 5'-phosphate group of the first fragment and the 3'-hydroxyl group of the second fragment form the nick therebetween. The at least one template strand contains a 3'-hydroxyl group, and the 3'-hydroxyl group of the template strand and the 5'-phosphate group of the second fragment form the nick therebetween. The first fragment, the second fragment, and the template strand form the double-stranded oligonucleotide together. The first fragment and the second fragment form the nucleotide strands of interest. The nick between the first fragment and the second fragment and the nick between the second fragment and the template strand both may be sealed under a catalytic effect of a double-stranded oligonucleotide ligase, thus forming an intact phosphodiester bond, and thereby completing a synthesis reaction of the nucleotide strands of interest.

Exemplarily, when "the nucleotide fragments simultaneously include the foregoing first fragment, second fragment, and third fragment, and the at least one template strand is of a hairpin structure", there are two instances as follows:

Instance 1: the template strand may be reversely complementary to a 5'-sequence of the first fragment, to form the first complementary region, the template strand may be reversely complementary to the 3'-sequence of the second fragment, to form the second complementary region, the third fragment is located between the first fragment and the second fragment. The 5'-phosphate group of the first fragment and a 3'-hydroxyl group of the third fragment form the nick therebetween. The 3'-hydroxyl group of the second fragment and a 5'-phosphate group of the third fragment form the nick therebetween. The third fragment is reversely complementary to a part of regions of the template strand, to form a third complementary region. The at least one template strand contains a 5'-phosphate group, and the 5'-phosphate group of the template strand and the 3'-hydroxyl group of the first fragment may form the nick therebetween. The first fragment, the second fragment, the third fragment, and the template strand form the double-stranded oligonucleotide together. The first fragment, the second fragment, and the third fragment form the nucleotide strand of interest together. All of the nick between the first fragment and the third fragment, the nick between the second fragment and the third fragment, and the nick between the first fragment and the template strand may be sealed under a catalytic effect of a double-stranded oligonucleotide ligase, thus forming an intact phosphodiester bond, and thereby completing a synthesis reaction of the nucleotide strands of interest.

Instance 2: the template strand may be reversely complementary to a 5'-sequence of the first fragment, to form the first complementary region. The template strand may be reversely complementary to a 3'-sequence of the second fragment, to form the second complementary region. A third fragment is located between the first fragment and the second fragment. The 5'-phosphate group of the first fragment and a 3'-hydroxyl group of the third fragment form the nick therebetween. The 3'-hydroxyl group of the second fragment and a 5'-phosphate group of the third fragment form the nick therebetween. The third fragment is reversely complementary to a part of regions of the template strand, to form a third complementary region. The at least one template strand contains a 3'-hydroxyl group, and the 3'-hydroxyl group of the template strand and the 5'-phosphate group of the second fragment may form the nick therebetween. The first fragment, the second fragment, the third fragment, and the template strand form the double-stranded oligonucleotide together. The first fragment, the second fragment, and the third fragment form the nucleotide strands of interest. All of the nick between the first fragment and the third fragment, the nick between the second fragment and the third fragment, and the nick between the second fragment and the template strand may be sealed under a catalytic effect of a double-stranded oligonucleotide ligase, thus forming an intact phosphodiester bond, and thereby completing a synthesis reaction of the nucleotide strands of interest.

In some optional embodiments of the disclosure, when the nucleotide units in the complex for synthesizing a nucleotide strand only have the nucleotide fragments (i.e., the first fragment and the second fragment), the first fragment or the second fragment may be of a hairpin structure, and the first fragment and the second fragment form the double-stranded oligonucleotide together. For example, the first fragment is of a hairpin structure; the first fragment may be reversely complementary to a 3'-sequence of the second fragment, and the 5' end of the first fragment and the 3' end of the second fragment may form the nick therebetween; and a nucleotide strand that the first fragment links to the second fragment is the nucleotide strand of interest. Alternatively, the second fragment is of a hairpin structure; the second fragment may be reversely complementary to a 5'-sequence of the first fragment, and the 3' end of the second fragment and the 5' end of the first fragment may form the nick therebetween; and a nucleotide strand that the first fragment links to the second fragment is the nucleotide strand of interest. In the above mode, it can be realized that the first fragment and the second fragment may form the double-stranded oligonucleotide together, and the first fragment and the second fragment may form the nucleotide strand of interest after being linked.

Exemplarily, when "the nucleotide units in the complex for synthesizing a nucleotide strand only have the first fragment and the second fragment, and the first fragment is of a hairpin structure", the 3' end of the second strand may be reversely complementary to the first fragment, the 5'-phosphate group of the first fragment and the 3'-hydroxyl group of the second fragment form the nick therebetween, the first fragment and the second fragment form the double-stranded oligonucleotide together, and the nick between the first fragment and the second fragment may be sealed under a catalytic effect of a double-stranded oligonucleotide ligase, thus forming an intact phosphodiester bond, and thereby completing the synthesis reaction of the nucleotide strands of interest. The nucleotide strand that the first fragment links to the second fragment is the nucleotide strand of interest.

Exemplarily, when "the nucleotide units in the complex for synthesizing a nucleotide strand only has the first fragment and the second fragment, and the second fragment is of a hairpin structure", the 5' end of the first fragment is reversely complementary to the second fragment, the 3'-hydroxyl group of the second fragment and the 5'-phosphate group of the first fragment form the nick therebetween, the first fragment and the second fragment form the double-stranded oligonucleotide together, and the nick between the first fragment and the second fragment may be sealed under a catalytic effect of a double-stranded oligonucleotide ligase, thus forming an intact phosphodiester bond, and thereby completing the synthesis reaction of the nucleotide strands of interest. The nucleotide strand that the first fragment links to the second fragment is the nucleotide strand of interest.

In some optional embodiments of the present disclosure, the template strand has at least two template fragments, the template fragments are of a straight-stranded structure, and the at least two template fragments may form the nick therebetween. The template strand may be reversely complementary to the 5'-sequence of the first fragment, to form the first complementary region. The template strand may be reversely complementary to the 3'-sequence of the second fragment, to form the second complementary region. The 5' end of the first fragment and the 3' end of the second fragment form the nick therebetween. The nucleotide fragments are hybridized to form the nucleotide strand of interest. In the above mode, it can be realized that the template strand and the nucleotide fragments can form the double-stranded oligonucleotide together, and the nucleotide fragments may form the nucleotide strand of interest.

Exemplarily, when "the nucleotide fragments only include the foregoing first fragment and second fragment, template strands are of a straight-stranded structure, and the template strand has two template fragments", the two template fragments form the nick therebetween, the two template fragments form the template strand together. The template strand may be reversely complementary to a 5'-sequence of the first fragment, to form the first complementary region. The template strand may be reversely complementary to a 3'-sequence of the second fragment, to form the second complementary region. The 5'-phosphate group of the first fragment and the 3'-hydroxyl group of the second fragment form the nick therebetween. The first fragment, the second fragment, and the two template fragments form the double-stranded oligonucleotide together. The first fragment and the second fragment form the nucleotide strand of interest. The nick between the first fragment and the second fragment and the nick between the two template fragments both may be sealed under a catalytic effect of a double-stranded oligonucleotide ligase, thus forming an intact phosphodiester bond, and thereby completing the synthesis reaction of the nucleotide strand of interest.

Exemplarily, when "the nucleotide fragments simultaneously include the foregoing first fragment, second fragment, and third fragment, template fragments are of a straight strand structure, and the template strand has two template fragments", the two template fragments form the nick therebetween, and the two template fragments form the template strand together. The 5' end of the template strand may be reversely complementary to the 5'-sequence of the first fragment, to form the first complementary region. The 3' end of the template strand may be reversely complementary to the 3'-sequence of the second fragment, to form the second complementary region. A middle region (i.e., a region between the 3' end and the 5' end) of the template strand may be reversely complementary to the third fragment, to form a third complementary region. The 5'-phosphate group of the first fragment and the 3'-hydroxyl group of the third fragment form the nick therebetween. The 5'-phosphate group of the third fragment and the 3'-hydroxyl group of the second fragment form the nick therebetween. The first fragment, the second fragment, the third fragment, and the two template fragments form the double-stranded oligonucleotide together. The first fragment, the second fragment, and the third fragment form the nucleotide strand of interest. All of the nick between the first fragment and the third fragment, the nick between the second fragment and the third fragment, and the nick between the two template fragments may be sealed under a catalytic effect of a double-stranded oligonucleotide ligase catalysis, thus forming an intact phosphodiester bond, and thereby completing the synthesis reaction of the nucleotide strand of interest.

Further, in some optional embodiments of the present disclosure, the foregoing template fragments include one fourth fragment and one fifth fragment. The fourth fragment contains a 5'-phosphate group, and the fourth fragment is synthesized in a 3'- to 5'-direction. The fifth fragment contains a 3'-hydroxyl group, and the fifth fragment is synthesized in a 5'- to 3'-direction. The 5' end of the fourth fragment and the 3' end of the fifth fragment form the nick therebetween. The 5' end of the first fragment and the 3' end of the second fragment form the nick therebetween.

Compared with cases where the group at the 3' end and the group at the 5' end of the template fragments and the synthesis direction of the template fragments are not limited, the above solution in which it is defined that "the template fragments include one fourth fragment and one fifth fragment" facilitates further reducing a content of non-target nucleotide strands in the synthesized product of the nucleotide strands, so as to further effectively improve the purity of the nucleotide strands of interest in the synthesized product, thereby being beneficial to fully exerting the efficacy of the nucleotide strands of interest.

Exemplarily, when "the nucleotide fragments only include the foregoing first fragment and second fragment, the template fragment is of a straight-stranded structure, the template strand has two template fragments, and the template fragment has one fourth fragment and one fifth fragment", a 5' end of the fourth fragment and a 3' end of the fifth fragment form the nick therebetween, and the fourth fragment and the fifth fragment form a template strand together. The template strand may be reversely complementary to the 5'-sequence of the first fragment, to form the first complementary region. The template strand may be reversely complementary to the 3'-sequence of the second fragment, to form the second complementary region. The 5'-phosphate group of the first fragment and the 3'-hydroxyl group of the second fragment form the nick therebetween, and the first fragment and the second fragment are hybridized to form the nucleotide strand of interest. A sequence of the nucleotide strand of interest is reversely complementary to a sequence of the template strand to form the double-stranded oligonucleotide. Both the nick between the first fragment and the second fragment and the nick between the fourth fragment and the fifth fragment may be sealed under a catalytic action of a double-stranded oligonucleotide ligase, thus forming an intact phosphodiester bond, and further completing a synthesis reaction of the nucleotide strand of interest.

Exemplarily, when "the nucleotide fragments simultaneously include the foregoing first fragment, second fragment, and third fragment, the template fragments are of a straight-stranded structure, the template strand has two template fragments, and the template fragments have one fourth fragment and one fifth fragment", a 5' end of the fourth fragment and a 3' end of the fifth fragment form the nick therebetween, and the fourth fragment and the fifth fragment form the template strand together. The 5' end of the template strand may be reversely complementary to the 5'-sequence of the first fragment, to form the first complementary region. The 3' end of the template strand may be reversely complementary to the 3'-sequence of the second fragment, to form the second complementary region. A middle region (i.e., a region between the 3' end and the 5' end) of the template strand may be reversely complementary to the third fragment, to form a third complementary region. The 5'-phosphate group of the first fragment and the 3'-hydroxyl group of the third fragment form the nick therebetween. The 5'-phosphate group of the third fragment and the 3'-hydroxyl group of the second fragment form the nick therebetween. The first fragment, the third fragment, and the second fragment are hybridized to form the nucleotide strand of interest. A sequence of the nucleotide strand of interest and a sequence of the template strand are reversely complementary to each other to form the double-stranded oligonucleotide. All of the nick between the first fragment and the third fragment, the nick between the second fragment and the third fragment, and the nick between the fourth fragment and the fifth fragment may be sealed under a catalytic effect of a double-stranded oligonucleotide ligase, thus forming an intact phosphodiester bond, and thereby completing the synthesis reaction of the nucleotide strand of interest.

In some optional embodiments of the disclosure, the nucleotide fragments further include a sixth fragment and a seventh fragment. The sixth fragment contains a 5'-phosphate group, and the sixth fragment is synthesized in a 3'- to 5'-direction. The seventh fragment contains a 3'-hydroxyl group, and the seventh fragment is synthesized in a 5'- to 3'-direction. The 5' end of the sixth fragment and the 3' end of the seventh fragment form the nick therebetween, and the sixth fragment and the seventh fragment form a first nucleotide strand of interest. The 5' end of the first fragment and the 3' end of the second fragment form the nick therebetween, and the first fragment and the second fragment form a second nucleotide strand of interest. The first nucleotide strand of interest and the second nucleotide strand of interest are hybridized to form the double-stranded oligonucleotide together.

In the above solution, the sixth fragment and the seventh fragment form the first nucleotide strand of interest, and the first fragment and the second fragment can form the second nucleotide strand of interest, which can further effectively reduce the content of non-target nucleotide strands in the synthesized product of the nucleotide strands, so as to further effectively improve the purity of the nucleotide strands of interest in the synthesized product, thereby being beneficial to fully exerting the efficacy of the nucleotide strands of interest.

Exemplarily, when "the nucleotide fragments simultaneously include the foregoing first fragment, second fragment, sixth fragment, and seventh fragment, and two complementary nucleotide strands in the double-stranded oligonucleotide both are the nucleotide strands of interest", a 5' end of the sixth fragment and a 3' end of the seventh fragment form the nick therebetween, and the sixth fragment and the seventh fragment form a first nucleotide strand of interest. The 5' end of the first fragment and the 3' end of the second fragment form the nick therebetween, and the first fragment and the second fragment form a second nucleotide strand of interest. The first nucleotide strand of interest and the second nucleotide strand of interest are templates to each other. A sequence of the first nucleotide strand of interest and a sequence of the second nucleotide strand of interest are reversely complementary to each other to form the double-stranded oligonucleotide. Both the nick between the first fragment and the second fragment and the nick between the sixth fragment and the seventh fragment may be sealed under a catalytic effect of a double-stranded oligonucleotide ligase to form an intact phosphodiester bond.

Further, with regard to cases where "the nucleotide fragments further include a sixth fragment and a seventh fragment, and simultaneously includes the foregoing third fragment", a 5' end of the sixth fragment and a 3' end of the seventh fragment form the nick therebetween, and the sixth fragment and the seventh fragment form a first nucleotide strand of interest. The 3' end of the third fragment and the 5' end of the first fragment form the nick therebetween, and the 5' end of the third fragment and the 3' end of the second fragment form the nick therebetween. The first fragment, the third fragment, and the second fragment are hybridized to form a second nucleotide strand of interest. The first nucleotide strand of interest and the second nucleotide strand of interest are hybridized to form the double-stranded oligonucleotide together.

In the above solution, the sixth fragment and the seventh fragment form the first nucleotide strand of interest, and the first fragment, the third fragment, and the second fragment can form the second nucleotide strand of interest, which can further effectively reduce the content of non-target nucleotide strands in the synthesized product of the nucleotide strands, so as to further effectively improve the purity of the nucleotide strands of interest in the synthesized product, thereby being beneficial to fully exerting the efficacy of the nucleotide strands of interest.

Exemplarily, when "the nucleotide fragments simultaneously include the foregoing first fragment, second fragment, third fragment, sixth fragment, and seventh fragment, and two complementary nucleotide strands in the double-stranded oligonucleotide are both the nucleotide strands of interest", a 5' end of the sixth fragment and a 3' end of the seventh fragment form the nick therebetween, and the sixth fragment and the seventh fragment form a first nucleotide strand of interest. A 5' end of the first nucleotide strand of interest may be reversely complementary to the 5'-sequence of the first fragment, to form the first complementary region, and a 3' end of the first nucleotide strand of interest may be reversely complementary to the 3'-sequence of the second fragment, to form the second complementary region; and a middle region (i.e., a region between the 3' end and the 5' end) of the first nucleotide strand of interest may be reversely complementary to the third fragment, to form a third complementary region. The 5'-phosphate group of the first fragment and the 3'-hydroxyl group of the third fragment form the nick therebetween, the 5'-phosphate group of the third fragment and the 3'-hydroxyl group of the second fragment form the nick therebetween, and the first fragment, the third fragment, and the second fragment are hybridized to form the second nucleotide strand of interest. The first nucleotide strand of interest and the second nucleotide strand of interest are templates to each other, and a sequence of the first nucleotide strand of interest and a sequence of the second nucleotide strand of interest are reversely complementary to form the double-stranded oligonucleotide. All of the nick between the first fragment and the third fragment, the nick between the second fragment and the third fragment, and the nick between the sixth fragment and the seventh fragment may be sealed under a catalytic effect of a double-stranded oligonucleotide ligase, thus forming a complete phosphodiester bond. To sum up, when the nucleotide fragments are DNA, the double-stranded oligonucleotide ligase is a DNA double-stranded oligonucleotide ligase. Exemplarily, the DNA double-stranded oligonucleotide ligase includes a T4 DNA ligase or a Taq DNA Ligase, etc.

To sum up, when the nucleotide fragments are RNA, the double-stranded oligonucleotide ligase is an RNA double-stranded oligonucleotide ligase. Exemplarily, the RNA double-stranded oligonucleotide ligase includes an Rnl2 family ligase and an Rnl5 family ligase, e.g., T4 RNA ligase2 and DraRnl (from *Naegleria gruberi*), etc.

It should be noted that the present disclosure does not limit the specific choice of the double-stranded oligonucleotide ligase. The double-stranded oligonucleotide ligase may be selected according to actual situations. The double-stranded oligonucleotide ligase may be a natural double-stranded oligonucleotide ligase, or may be a mutant strain generated by enzyme mutation or modification and evolution, or an enzyme which generates a nick-sealing activity upon enzyme fusion in the same family or with enzymes in other families.

In some optional embodiments of the present disclosure, the nucleotide fragments contain 4~200 bases, which can better reduce the content of non-target nucleotide strands in the synthesized product of the nucleotide strands greatly, so as to effectively improve the purity of the nucleotide strands of interest in the synthesized product, and further to be beneficial to fully exerting the efficacy of the nucleotide strands of interest.

Further, the nucleotide fragments contain 4~120 bases, which facilitates further reducing the content of non-target nucleotide strands in the synthesized product of the nucleotide strands, so as to effectively improve the purity of the nucleotide strands of interest in the synthesized product, and further to be beneficial to fully exerting the efficacy of the nucleotide strands of interest.

In some optional embodiments of the present disclosure, the at least one template strand contains a modifying group.

Exemplarily, the modifying group of the template strand may be a modifying group on a base, a modifying group on a sugar ring, a modifying group on a phosphate group, and the like, which is not limited in the present disclosure.

It should be noted that, in other optional embodiments of the present disclosure, the template strand may not contain a modifying group. The present disclosure does not limit whether the at least one template strand contains a modifying group.

In some optional embodiments of the present disclosure, the nucleotide fragments contain a modifying group.

It should be noted that, in other optional embodiments of the present disclosure, the nucleotide fragments may not contain a modifying group. The present disclosure does not limit whether the nucleotide fragments contain a modifying group.

Exemplarily, the modifying group of the nucleotide fragments may be a modifying group on a base, a modifying group on a sugar ring, a modifying group on a phosphate group, and the like, which is not limited in the present disclosure.

In some optional embodiments of the present disclosure, a method for preparing the template strand includes: performing reactions of synthesizing the template strand according to a sequence of interest, without purification treatment of a synthesized product. Since the complex for synthesizing a nucleotide strand provided in the present disclosure has "the first fragment synthesized in the 3'- to 5'-direction and containing the 5'-phosphate group" and "the second fragment synthesized in the 5'- to 3'-direction and containing the 3'-hydroxyl group", even if the purification treatment is not performed after the template strand is synthesized, a content of non-target nucleotide strands in the synthesized product of the nucleotide strands also can be effectively reduced, so that the purity of the nucleotide strands of interest in the synthesized product is effectively improved, and it is further beneficial to exerting the efficacy of the nucleotide strands of interest.

It can be understood that if protection of a protecting group is involved in the process of synthesizing the template strand, it is also necessary to perform an operation of removing the protecting group in the synthesizing process.

Further, in some optional embodiments of the present disclosure, the method for preparing the template strand includes: performing reactions of synthesizing the template strand according to a sequence of interest, and then performing a desalting treatment only on the synthesized product.

It should be noted that, in other optional embodiments of the present disclosure, the method for preparing a template strand also may include: performing reactions of synthesizing the template strand according to a sequence of interest, and then performing a purification treatment on the synthesized product, so as to obtain a higher-purity template strand.

It should be noted that the present disclosure does not define a synthesis route of the template strand. The principle of H-phosphonate, the principle of phosphoramidite, or the principle of enzymatic synthesis can be used. The synthesis route may be solid phase synthesis or liquid phase synthesis.

In some optional embodiments of the present disclosure, a method for preparing the nucleotide fragments includes: performing reactions of synthesizing the nucleotide fragments according to a sequence of interest, without purification treatment of a synthesized product. Since the complex for synthesizing a nucleotide strand provided in the present disclosure has "the first fragment synthesized in the 3'- to 5'-direction and containing the 5'-phosphate group" and "the second fragment synthesized in the 5'- to 3'-direction and containing the 3'-hydroxyl group", even if the purification treatment is not performed after the nucleotide fragments are synthesized, a content of non-target nucleotide strands in the synthesized product of the nucleotide strands also can be effectively reduced, so that purity of the nucleotide strands of interest in the synthesized product is effectively improved, and it is further beneficial to exerting the efficacy of the nucleotide strands of interest can be fully exerted.

It can be understood that if protection of a protecting group is involved in the process of synthesizing the nucleotide fragments, it is also necessary to perform an operation of removing the protecting group in the synthesizing process.

Further, in some optional embodiments of the present disclosure, the method for preparing nucleotide fragments includes: performing reactions of synthesizing the nucleotide fragments according to a sequence of interest, and then performing a desalting treatment only on the synthesized product.

It should be noted that in other optional embodiments of the present disclosure, the method for preparing nucleotide fragments further may include: performing reactions of synthesizing the nucleotide fragments according to a sequence of interest, and then performing a purification treatment on the synthesized product, so as to obtain higher-purity nucleotide fragments.

It should be noted that the present disclosure does not define a synthesis route of the nucleotide fragments. The principle of H-phosphonate, the principle of phosphoramidite, or the principle of enzymatic synthesis can be used. The synthesis route may be solid phase synthesis or liquid phase synthesis.

Exemplarily, in the complex for synthesizing one or more nucleotide strands of interest, a concentration of the nucleotide fragments may be 1 μM~100 mM. In the nucleotide fragments, a molar ratio between any two fragments may be (0.1:1)~(1:0.1). It should be noted that, the concentration of the nucleotide fragments and a concentration of the template strand may be adjusted according to actual situations, which is not limited in the present disclosure.

Exemplarily, in the complex for synthesizing one or more nucleotide strands of interest, a concentration of the double-stranded oligonucleotide ligase may be 0.01 U/μl~10 U/μl. It should be noted that, the concentration of the double-stranded oligonucleotide ligase may be adjusted according to actual situations, which is not limited in the present disclosure.

In some optional embodiments of the present disclosure, the complex for synthesizing one or more nucleotide strands of interest further includes a buffer solution containing divalent ions.

Exemplarily, the divalent ions may be magnesium ions, manganese ions, or the like; the buffer solution may be a phosphate buffer solution, a Tris buffer solution, a HEPES buffer solution, or the like; a selection range of pH of the buffer solution takes pH corresponding to optimal catalytic activity of enzyme used in the complex as a reference value, for example, when the double-stranded enzyme is T4 RNA Ligase2, a pH value of the buffer solution may be 6.5~9.0.

In some optional embodiments of the present disclosure, the complex for synthesizing one or more nucleotide strands of interest further includes DTT.

In some optional embodiments of the present disclosure, the complex for synthesizing one or more nucleotide strands of interest further includes EDTA. EDTA functions to terminate the synthesis reaction by chelating the divalent ions in the buffer solution.

Exemplarily, the complex for synthesizing one or more nucleotide strands of interest further may be added with PEG so as to improve the efficiency of the synthesis reaction. A surfactant may also be added so as to improve stability of the enzyme. An auxiliary factor such as ATP may also be added.

It can be understood that the complex for synthesizing one or more nucleotide strands of interest can only have the template strand, the nucleotide fragments, and the double-stranded oligonucleotide ligase. As to other substances required for the reaction of synthesizing the nucleotide, such as a buffer solution, ATP, DTT, and EDTA, they can be correspondingly added during the reaction.

The present disclosure further provides a method for synthesizing one or more nucleotide strands of interest, including: performing a ligation reaction to synthesize the nucleotide strand of interest by using the complex as provided above.

For the method for synthesizing one or more nucleotide strands of interest provided in the present disclosure, since synthesis raw materials have "the first fragment synthesized in the 3'- to 5'-direction and containing the 5'-phosphate group" and "the second fragment synthesized in the 5'- to 3'-direction and containing the 3'-hydroxyl group", and the first fragment and the second fragment can hybridize with each other, a content of non-target nucleotide strands (particularly n−1 impurity, n−2 impurity, n+1 impurity, and n+2 impurity) in a synthesized product of nucleotide strands can be greatly reduced, so as to effectively improve purity of nucleotide strands of interest in the synthesized product, thereby being beneficial to fully exerting the efficacy of the nucleotide strands of interest.

It can be understood that, in the method for synthesizing one or more nucleotide strands of interest provided in the present disclosure, the complex for synthesizing one or more nucleotide strands of interest includes the template strand, the nucleotide fragments, and the double-stranded oligonucleotide ligase. Reference can be made to the above contents for relevant choices of the template strand, the nucleotide fragments, the double-stranded oligonucleotide ligase, etc., which will not be repeated herein.

Exemplarily, the synthesis reaction of the nucleotide strand is conducted at 37° C. for about 4 h. A specific reaction temperature and reaction time can be adjusted according to actual situations, which is not limited in the present disclosure.

To sum up, the synthesis reaction of the nucleotide strand can be terminated by adding EDTA to chelate the divalent ions in the buffer solution. In other feasible embodiments, the synthesis reaction of the nucleotide strand may also be terminated by heating to a denature temperature (e.g., 80° C.) of the nucleotide strand.

In order to make the objectives, technical solutions, and advantages of the examples of the present disclosure clearer, the technical solutions in the examples of the present disclosure are described clearly and completely below. Where no specific conditions are specified in the examples, they are carried out under normal conditions or conditions recommended by manufacturers. Where manufacturers of reagents or apparatuses used are not specified, they are conventional products commercially available.

Example 1

The present example provides a method for synthesizing one or more nucleotide strands of interest, including the following steps:

(1) Synthesis of a Nucleotide Fragment 1 Synthesized in a 3'- to 5'-Direction:

Synthesis equipment Mermade 12 synthesizer was used, and a synthesis scale was 10 μM.

5'-Dimethoxytrityl-N4-acetyl-Cytidine, 2'-TBDMS-3'-succinoyl-long chain alkylamino-CPG from Glen research company was chosen as a solid support.

N6-benzoyl-5'-O-(4,4-dimethoxytrityloxy)-2'-O-[(tert-butyl)dimethylsilyl] adenosine-3'-(2-cyanoethyl-N,N-diisopropyl)phosphoramidite (i.e., 5'-DMT-2'-O-TBDMS-A(Bz)-3'-CE-Phosphoramidite), 5'-O-(4,4-dimethoxytrityloxy)-2'-O-[(tert-butyl)dimethylsilyl]-N2-isobutyrylguanosine-3'-(2-cyanoethyl-N,N-diisopropyl) phosphoramidite (i.e., 5'-DMT-2'-O-TBDMS-G(iBu)-3'-CE-Phosphoramidite), N4-acetyl-5'-O-(4,4-dimethoxytrityloxy)-2'-O-[(tert-butyl)dimethylsilyl] cytidine-3'-(2-cyanoethyl-N,N-diisopropyl)phosphoramidite (i.e., 5'-DMT-2'-O-TBDMS-C(Ac)-3'-CE-Phosphoramidite), 5'-O-(4,4-dimethoxytrityloxy)-2-O-[(tert-butyl)dimethylsilyl] uridine-3-(2-cyanoethyl-N,N-diisopropyl)phosphoramidite (i.e. 5'-DMT-2'-O-TBDMS-U-3'-CE-Phosphoramidite), N6-benzoyl-5'-O-(4,4-dimethoxytrityloxy)-2'-O-methyladenosine-3'-(2-cyanoethyl-N,N-diisopropyl)phosphoramidite (i.e., 5'-DMT-2'-OMe-A(Bz)-3'-CE-Phosphoramidite), and 5'-O-(4,4-dimethoxytrityloxy)-2'-O-methyl-N2-isobutyrylguanosine-3'-(2-cyanoethyl-N,N-diisopropyl)phosphoramidite (i.e., 5'-DMT-2'-OMe-G(iBu)-3'-CE-Phosphoramidite) were chosen as 3' phosphoramidite monomers. The above 3' phosphoramidite monomers were respectively dissolved in anhydrous acetonitrile, to obtain corresponding 0.1 M solutions.

A 3 wt % trichloroacetic acid (i.e., TCA) solution (dichloromethane as a solvent) was chosen as a deprotecting reagent of dimethoxytrityloxy (i.e., DMT).

A 0.25 M 5-ethylthiotetrazole (i.e., ETT) solution (with acetonitrile as a solvent) was chosen as an activator reagent.

A 0.05 M iodine (I$_2$) solution (a mixed solution of pyridine and water in a volume ratio of 9:1 as a solvent) was chosen as an oxidation reagent.

Phenylacetyl disulfide (i.e., PADS) was chosen as a sulfurizing reagent.

A mixed solution of acetic anhydride (Ac2O) and acetonitrile in a volume ratio of 1:4 was chosen as capping reagent A.

A mixed solution of N-methylimidazole, pyridine, and acetonitrile in a volume ratio of 2:3:5 was chosen as capping reagent B.

20 μmol of the foregoing solid support was loaded into a synthesis column, to synthesize from a 3' end to a 5' end according to a target product sequence (5'-mA*mG*mG*AUGCGCUAAGUAGCGUGCGUUUU AGUACUCUGGAAACAGAAUCUAC-3', SEQ ID NO: 1). Synthesis of each base underwent one cycle. Each cycle had the following steps: 1, to the synthesis column adding 2 mL of the foregoing deprotecting reagent for deprotection for 40 s, and then washing system in the synthesis column with acetonitrile; 2, to the synthesis column adding 470 μL of the foregoing activator reagent and 630 μL of a corresponding monomer solution for coupling for 6 min, and then washing the system in the synthesis column with acetonitrile; 3, to the synthesis column adding 1.6 mL of an oxidation reagent or 1.6 mL of a sulfurizing reagent, and after treating for 3 min, washing the system in the synthesis column with acetonitrile; and 4, to the synthesis column adding the foregoing capping reagent A (1 mL) and capping reagent B (1 mL), and 30 s later, entering a next cycle.

The solid support in the synthesis column was washed with 90 mL of acetonitrile, and was transferred into a 15 mL centrifuge tube. At a condition of 65° C., to the foregoing centrifuge tube a mixed aqueous solution of 10 mL of ammonia water/40 wt % methylamine (V:V, 1:1) was added for incubation for 30 min. Centrifugation was carried out at 13000 rpm for 3 min, and supernatant was collected and dried under vacuum. Then 4 mL of a 12 wt % tetraethylammonium chloride solution (diluted in dimethyl sulfoxide) was added at 25° C., followed by ultrasound for 1 h, to remove tert-butyldimethylsilane groups. Precipitate was washed by adding 12 mL of n-butanol, then washed with 4 mL of ethanol, and then centrifuged at 13000 rpm for 3 min. Supernatant was removed, and precipitate was dissolved with 1 mL of ultrapure water. A synthesized product obtained is as shown in Table 1.

TABLE 1

| Target Product | 5'-mA*mG*mG*AUGCGCUAAGUAGCGUGCGUUUUAGU ACUCUGGAAACAGAAUCUAC-3', SEQ ID NO: 1 |
|---|---|
| n-1 Impurity | 5'-mG*mG*AUGCGCUAAGUAGCGUGCGUUUUAGUACU CUGGAAACAGAAUCUAC-3', SEQ ID NO: 2 |
| n-2 Impurity | 5'-mG*AUGCGCUAAGUAGCGUGCGUUUUAGUACUCUG GAAACAGAAUCUAC-3', SEQ ID NO: 3 |
| n-3 Impurity | 5'-AUGCGCUAAGUAGCGUGCGUUUUAGUACUCUGGAA ACAGAAUCUAC-3', SEQ ID NO: 4 |

In Table 1, m represents 2'OMe modification, i.e., 2' position on nucleoside sugar is modified by methoxy; and * represents phosphorothioate.

(2) Fragment 1 Synthesized in a 5'- to 3'-Direction:

Synthesis equipment Mermade 12 synthesizer was used, and a synthesis scale was 10 uM.

3'-O-(4,4-dimethoxytrityloxy)-N6-benzoyl-2'-O-methyladenosine 5'-long-chain alkylamino CPG (i.e., 3'-Dimethoxytrityl-2'-OMe-A (Bz)-5'-succinoyl-long chain alkylamino-CPG) was chosen as a solid support.

N6-benzoyl-3'-O-(4,4-dimethoxytrityloxy)-2'-O-[(tert-butyl)dimethylsilyl] adenosine-5'-(2-cyanoethyl-N,N-diisopropyl)phosphoramidite (i.e., 5'-DMT-2'-O-TBDMS-A (Bz)-5'-CE-Phosphoramidite), 3'-O-(4,4-dimethoxytrityloxy)-2'-O-[(tert-butyl)dimethylsilyl]-N2-isobutyrylguanosine-5'-(2-cyanoethyl-N,N-diisopropyl)phosphoramidite (i.e., 3'-DMT-2'-O-TBDMS-G(iBu)-5'-CE-Phosphoramidite), N4-acetyl-3'-O-(4,4-dimethoxytrityloxy)-2'-O-[(tert-butyl)dimethylsilyl] cytidine-5'-(2-cyanoethyl-N,N-diisopropyl)phosphoramidite (i.e., 3'-DMT-2'-O-TBDMS—C(Ac)-5'-CE-Phosphoramidite), 3'-O-(4,4-dimethoxytrityloxy)-2'-O-[(tert-butyl)dimethylsilyl] uridine-5'-(2-cyanoethyl-N,N-diisopropyl)phosphoramidite (i.e. 3'-DMT-2'-O-TBDMS-U-5'-CE-Phosphoramidite), and 3'-O-(4,4-dimethoxytrityloxy)-2'-O-methyl-N2-isobutyrylguanosine-3'-(2-cyanoethyl-N,N-diisopropyl)phosphoramidite (i.e., 3'-DMT-2'-OMe-iBu-G-5'-CE-Phosphoramidite) were chosen as 5' phosphoramidite monomers. The above 5' phosphoramidite monomers were respectively dissolved in anhydrous acetonitrile, to obtain corresponding 0.1 M solutions.

A 3 wt % trichloroacetic acid (i.e., TCA) solution (dichloromethane as a solvent) was chosen as a deprotecting reagent of dimethoxytrityloxy (i.e., DMT).

A 0.25 M 5-ethylthiotetrazole (i.e., ETT) solution (acetonitrile as a solvent) was chosen as an activator reagent.

A 0.05 M iodine (I$_2$) solution (a mixed solution of pyridine and water in a volume ratio of 9:1 as a solvent) was chosen as an oxidation reagent.

Phenylacetyl disulfide (i.e., PADS) was chosen as a sulfurizing reagent.

A mixed solution of acetic anhydride (Ac2O) and acetonitrile in a volume ratio of 1:4 was chosen as capping reagent A.

A mixed solution of N-methylimidazole, pyridine, and acetonitrile in a volume ratio of 2:3:5 was chosen as capping reagent B.

20 μmol of the foregoing solid support was loaded into a synthesis column, to synthesize from a 5' end to a according to a target product sequence (5'-3' end mA*mG*mG*AUGCGCUAAGUAGCGUGCGU UUUAGUACUCUGGAAACAGAAUCUAC-3', SEQ ID NO: 1). Synthesis of each base underwent one cycle. Each cycle had the following steps: 1, to the synthesis column adding 2 mL of the foregoing deprotecting reagent for deprotection for 40 s, and then washing system in the synthesis column with acetonitrile; 2, to the synthesis column adding 470 μL of the foregoing activator reagent and 630 μL of a corresponding monomer solution for coupling for 6 min, and then washing the system in the synthesis column with acetonitrile; 3, to the synthesis column adding 1.6 mL of an oxo reagent or 1.6 mL of a thio reagent, and after treating for 3 min, washing the system in the synthesis column with acetonitrile; and 4, to the synthesis column adding the foregoing capping reagent A (1 mL) and capping reagent B (1 mL), and 30 s later, entering a next cycle.

The solid support in the synthesis column was washed with 90 mL of acetonitrile, and was transferred into a 15 mL centrifuge tube. At a condition of 65° C., to the foregoing centrifuge tube a mixed aqueous solution of 10 mL of ammonia water/40 wt % methylamine (V:V, 1:1) was added for incubation for 30 min. Centrifugation was carried out at 13000 rpm for 3 min, and supernatant was collected and dried under vacuum. Then 4 mL of a 12 wt % tetraethylammonium chloride solution (diluted in dimethyl sulfoxide) was added at 25° C., followed by ultrasound for 1 h, to remove tert-butyldimethylsilane groups. Precipitate was washed by adding 12 mL of n-butanol, washed with 4 mL of ethanol, and then centrifuged at 13000 rpm for 3 min. Supernatant was removed, and precipitate was dissolved with 1 mL of ultrapure water. A synthesized product obtained is as shown in Table 2.

TABLE 2

| | |
|---|---|
| Target Product | 5'-mA*mG*mG*AUGCGCUAAGUAGCGUGCGUUUUAGUAC UCUGGAAACAGAAUCUAC-3', SEQ ID NO: 1 |
| n-1 Impurity | 5'-mA*mG*mG*AUGCGCUAAGUAGCGUGCGUUUUAGUAC UCUGGAAACAGAAUCUA-3', SEQ ID NO: 5 |
| n-2 Impurity | 5'-mA*mG*mG*AUGCGCUAAGUAGCGUGCGUUUUAGUAC UCUGGAAACAGAAUCU-3', SEQ ID NO: 6 |
| n-3 Impurity | 5'-mA*mG*mG*AUGCGCUAAGUAGCGUGCGUUUUAGUAC UCUGGAAACAGAAUC-3', SEQ ID NO: 7 |

In Table 2, m represents 2'-ome modification, i.e., 2' position on nucleoside sugar is modified by methoxy; and * represents a phosphorothioate.

(3) Synthesis of a Nucleotide Fragment 2 Synthesized in the 3'- to 5'-Direction:

Synthesis of the nucleotide fragment 2 synthesized in the 3'- to 5'-direction was substantially the same as that in step (1), while a difference lies in that only [3'-O-(4,4-dimethoxytrityloxy)-2,2'-dicarboxyethyl]propyl-(2-cyanoethyl)-(N,N-isopropyl)phosphoramidite (i.e., 3-(4,4'-Dimethoxytrityloxy)-2,2-dicarboxyethyl]propyl-(2-cyanoethyl)-(N,N-diisopropyl)-phosphoramidite) was chosen as 3' phosphoramidite monomer.

A synthesized product obtained is as shown in Table 3.

TABLE 3

| | |
|---|---|
| Target Product | 5'-pUAAAACAAGGCAAAAUGCCGUGUUUmAmUmCmUm CmGmUmCmAmAmCmUmUmGmUmUmGmGmCmGmAmGmAm U*mU*mU*mU-3', SEQ ID NO: 8 |
| n-1 Impurity | 5'-AAAACAAGGCAAAAUGCCGUGUUUmAmUmCmUmCm GmUmCmAmAmCmUmUmGmUmUmGmGmCmGmAmGmAmU* mU*mU*mU-3', SEQ ID NO: 9 |
| n-2 Impurity | 5'-AAACAAGGCAAAAUGCCGUGUUUmAmUmCmUmCmGm UmCmAmAmCmUmUmGmUmUmGmGmCmGmAmGmAmU*mU* mU*mU-3', SEQ ID NO: 10 |
| n-3 Impurity | 5'-AACAAGGCAAAAUGCCGUGUUUmAmUmCmUmCmGm UmCmAmAmCmUmUmGmUmUmGmGmCmGmAmGmAmU*mU* mU*mU-3', SEQ ID NO: 11 |

In Table 3, m represents 2'-ome modification, i.e., 2' position on nucleoside sugar is modified by methoxy; * represents a phosphorothioate; and p represents a phosphate group.

(4) Synthesis of the Nucleotide Fragment 2 Synthesized in the 5'- to 3'-Direction:

Synthesis of the nucleotide fragment 2 synthesized in the 5'- to 3'-direction was substantially the same as step (2), while a difference lies in that 3-(4,4'-Dimethoxytrityloxy)-2,2-(dicarboxymethylamido) propyl-1-O-succinoyl-long chain alkylamino-CPG from Glen Research company was used as a solid support.

A synthesized product obtained is as shown in Table 4.

TABLE 4

| | |
|---|---|
| Target Product | 5'-pUAAAACAAGGCAAAAUGCCGUGUUUmAmUmCmUm CmGmUmCmAmAmCmUmUmGmUmUmGmGmCmGmAmGmAm U*mU*mU*mU-3', SEQ ID NO: 8 |
| n-1 Impurity | 5'-pUAAAACAAGGCAAAAUGCCGUGUUUmAmUmCmUm CmGmUmCmAmAmCmUmUmGmUmUmGmGmCmGmAmGmAm U*mU*mU-3', SEQ ID NO: 12 |
| n-2 Impurity | 5'-pUAAAACAAGGCAAAAUGCCGUGUUUmAmUmCmUm CmGmUmCmAmAmCmUmUmGmUmUmGmGmCmGmAmGmAm U*mU-3', SEQ ID NO: 13 |
| n-3 Impurity | 5'-pUAAAACAAGGCAAAAUGCCGUGUUUmAmUmCmUm CmGmUmCmAmAmCmUmUmGmUmUmGmGmCmGmAmGmAm U-3', SEQ ID NO: 14 |

In Table 4, m represents 2'-ome modification, i.e., 2' position on nucleoside sugar is modified by methoxy; * represents a phosphorothioate; and p represents a phosphate group.

(5) Synthesis of a Template Strand 1 Synthesized in the 3'- to 5'-Direction:

Synthesis equipment Mermade 12 synthesizer was used, and a synthesis scale was 10 μM.

5'-Dimethoxytrityl-N-benzoyl-2'-deoxyThymidine-3'-succinoyl-long chain alkylamino-CPG from Glen research company was chosen as a solid support.

N6-benzoyl-5'-O-(4,4-dimethoxytrityloxy)-2'-deoxyadenosine-3'-(2-cyanoethyl-N,N-diisopropyl)phosphoramidite (i.e., 5'-DMT-dA(Bz)-3'-CE-Phosphoramidite), 5'-O-(4,4-dimethoxytrityloxy)-N2-isobutyryl-2'-deoxyguanosine-3'-(2-cyanoethyl-N,N-diisopropyl)phosphoramidite (i.e., 5'-DMT-dG(iBu)-3'-CE-Phosphoramidite), N4-acetyl-5'-O-(4,4-dimethoxytrityloxy)-2'-deoxycytidine-3'-(2-cyanoethyl-N,N-diisopropyl)phosphoramidite (i.e., 5'-DMT-dC(Ac)-3'-CE-Phosphoramidite), and 5'-O-(4,4-dimethoxytrityloxy)-2'-deoxythymidine-3-(2-cyanoethyl-N,N-diisopropyl)phosphoramidite (i.e. 5'-DMT-dT-3'-CE-Phosphoramidite) were chosen as 3' phosphoramidite monomers. The above 3' phosphoramidite monomers were respectively dissolved in anhydrous acetonitrile, to obtain corresponding 0.1 M monomer solutions.

A 3 wt % trichloroacetic acid (i.e., TCA) solution (dichloromethane as a solvent) was chosen as a deprotecting reagent of dimethoxytrityloxy (i.e., DMT).

A 0.25 M 5-ethylthiotetrazole (i.e., ETT) solution (acetonitrile as a solvent) was chosen as an activator reagent.

A 0.05 M iodine ($I_2$) solution (a mixed solution of pyridine and water in a volume ratio of 9:1 as a solvent) was chosen as an oxidation reagent.

Phenylacetyl disulfide (i.e., PADS) was chosen as a sulfurizing reagent.

A mixed solution of acetic anhydride (Ac2O) and acetonitrile in a volume ratio of 1:4 was chosen as capping reagent A.

A mixed solution of N-methylimidazole, pyridine, and acetonitrile in a volume ratio of 2:3:5 was chosen as capping reagent B.

20 μmol of the foregoing solid support was loaded into a synthesis column, to synthesize from a 3' end to a 5' end according to a target product sequence (3'-TGA-GACCTTTGTCTTAGATGATTTTGTTCCGTTT-TACGGA-5', SEQ ID NO: 15). Synthesis of each base underwent one cycle. Each cycle had the following steps: 1, to the synthesis column adding 2 mL of the foregoing deprotecting reagent for deprotection for 40 s, and then washing system in the synthesis column with acetonitrile; 2, to the synthesis column adding 470 μL of the foregoing activator reagent and 630 μL of a corresponding monomer solution for coupling for 6 min, and then washing the system in the synthesis column with acetonitrile; 3, to the synthesis column adding 1.6 mL of an oxo reagent or 1.6 mL of a thio reagent, and after treating for 3 min, washing the system in the synthesis column with acetonitrile; and 4, to the synthesis column adding the foregoing capping reagent A (1 mL) and capping reagent B (1 mL), and 30 s later, entering a next cycle.

A sequence of the template strand 1 is as follows:

```
                                             SEQ ID NO: 15
3'-TGAGACCTTTGTCTTAGATGATTTTGTTCCGTTTTACGGA-5',.
```

(6) Ligation Reaction of Nucleotide Strand of Interest:

To a tris buffer solution with a pH of 8.0, containing 400 μM ATP, 2 mM MgCl$_2$, 1 mM DTT, 200 μM template strand 1, 200 μM nucleotide fragment 1 (synthesized in the 3'- to 5'-direction or the 5'-to 3'-direction), and 200 μM nucleotide fragment 2 (synthesized in the 3'- to 5'-direction or the 5'- to 3'-direction), T4 RNA Ligase2 (a final concentration thereof in a reaction solution was 0.3 U/μL) was added, and after 4 h of reaction at 37° C., EDTA (a final concentration thereof in the reaction solution was 3 mM) was added to terminate the reaction, to obtain a synthesized product.

In the above, specific reaction is divided into four reactions, as shown in Table 5.

TABLE 5

|  | Nucleotide Fragment 1 | Nucleotide Fragment 2 |
|---|---|---|
| Reaction 1 | Synthesis in 3'- to 5'-Direction | Synthesis in 3'- to 5'-Direction |
| Reaction 2 | Synthesis in 3'- to 5'-Direction | Synthesis in 5'- to 3'-Direction |
| Reaction 3 | Synthesis in 5'- to 3'-Direction | Synthesis in 3'- to 5'-Direction |
| Reaction 4 | Synthesis in 5'- to 3'-Direction | Synthesis in 5'- to 3'-Direction |

Example 2

The present example provides a method for synthesizing one or more nucleotide strands of interest, including the following steps:

(1) Synthesis of a Nucleotide Fragment 5 Synthesized in a 3'- to 5'-Direction:

A synthesis step is the same as step (1) in Example 1, and a synthesized product obtained is as shown in Table 6.

TABLE 6

| Target Product | 5'-mA*fC*mAfAfAfAmGfCmA-3' |
|---|---|
| n-1 Impurity | 5'-fC*mAfAfAfAmGfCmA-3' |
| n-2 Impurity | 5'-mAfAfAfAmGfCmA-3' |
| n-3 Impurity | 5'-fAfAfAmGfCmA-3' |

In Table 6, m represents 2'ome modification, i.e., 2' position on nucleoside sugar is modified by methoxy; * represents a phosphorothioate; and f represents 2'F modification, i.e., the 2' position on the nucleoside sugar is modified by fluorine.

(2) Synthesis of the Nucleotide Fragment 5 Synthesized in a 5'- to 3'-Direction:

A synthesis step is the same as step (2) in Example 1, and a synthesized product obtained is as shown in Table 7.

TABLE 7

| Target Product | 5'-mA*fC*mAfAfAfAmGfCmA-3' |
|---|---|
| n-1 Impurity | 5'-mA*fC*mAfAfAfAmGfC-3' |
| n-2 Impurity | 5'-mA*fC*mAfAfAfAmG-3' |
| n-3 Impurity | 5'-mA*fC*mAfAfAfA-3' |

In Table 7, m represents 2'ome modification, i.e., 2' position on nucleoside sugar is modified by methoxy; * represents a phosphorothioate; and f represents 2'F modification, i.e., the 2' position on the nucleoside sugar is modified by fluorine.

(3) Synthesis of a Nucleotide Fragment 6 Synthesized in the 3'- to 5'-Direction:

A synthesis step is the same as step (1) in Example 1, and a synthesized product obtained is as shown in Table 8.

TABLE 8

| Target Product | 5'-pfAmAmAmCfAmGfG-3' |
|---|---|
| n-1 Impurity | 5'-mAmAmCfAmGfG-3' |
| n-2 Impurity | 5'-mAmCfAmGfG-3' |
| n-3 Impurity | 5'-mCfAmGfG-3' |

In Table 8, m represents 2'ome modification, i.e., 2' position on nucleoside sugar is modified by methoxy; p represents a phosphate group; and f represents 2'F modification, i.e., the 2' position on the nucleoside sugar is modified by fluorine.

(4) Synthesis of the Nucleotide Fragment 6 Synthesized in the 5'- to 3'-Direction:

A synthesis step is the same as step (2) in Example 1, and a synthesized product obtained is as shown in Table 9.

TABLE 9

| Target Product | 5'-pfAmAmAmCfAmGfG-3' |
|---|---|
| n-1 Impurity | 5'-pfAmAmAmCfAmG-3' |
| n-2 Impurity | 5'-pfAmAmAmCfA-3' |
| n-3 Impurity | 5'-pfAmAmAmC-3' |

In Table 9, m represents 2'ome modification, i.e., 2' position on nucleoside sugar is modified by methoxy; p represents a phosphate group; and f represents 2'F modification, i.e., the 2' position on the nucleoside sugar is modified by fluorine.

(5) Synthesis of the Nucleotide Fragment 7 Synthesized in the 3'- to 5'-Direction:

A synthesis step is the same as step (1) in Example 1, and a synthesized product obtained is as shown in Table 10.

TABLE 10

| Target Product | 5'-pmUfCmUmAmG*mA*mA-3' |
|---|---|
| n-1 Impurity | 5'-fCmUmAmG*mA*mA-3' |

TABLE 10-continued

| n-2 Impurity | 5'-mUmAmG*mA*mA-3' |
|---|---|
| n-3 Impurity | 5'-mAmG*mA*mA-3' |

In Table 10, m represents 2'ome modification, i.e., 2' position on nucleoside sugar is modified by methoxy; * represents a phosphorothioate; p represents a phosphate group; and f represents 2'F modification, i.e., the 2' position on the nucleoside sugar is modified by fluorine.

(6) Synthesis of a Nucleotide Fragment 7 Synthesized in the 5'- to 3'-Direction:

A synthesis step is the same as step (2) in Example 1, and a synthesized product obtained is as shown in Table 11.

TABLE 11

| Target Product | 5'-pmUfCmUmAmG*mA*mA-3' |
|---|---|
| n-1 Impurity | 5'-pmUfCmUmAmG*mA-3' |
| n-2 Impurity | 5'-pmUfCmUmAmG-3' |
| n-3 Impurity | 5'-pmUfCmUmA-3' |

In Table 11, m represents 2'ome modification, i.e., 2' position on nucleoside sugar is modified by methoxy; * represents a phosphorothioate; p represents a phosphate group; and f represents 2'F modification, i.e., the 2' position on the nucleoside sugar is modified by fluorine.

(7) Synthesis of a Template Strand 2 Synthesized in the 3'- to 5'-Direction:

Synthesis equipment Mermade 12 synthesizer was used, and a synthesis scale was 10 μM.

5'-Dimethoxytrityl-2'-deoxyThymidine-3'-succinoyl-long chain alkylamino-CPG from Glen research company was chosen as a solid support.

N6-benzoyl-5'-O-(4,4-dimethoxytrityloxy)-2'-deoxyadenosine-3'-(2-cyanoethyl-N,N-diisopropyl)phosphoramidite (i.e., 5'-DMT-dA(Bz)-3'-CE-Phosphoramidite), 5'-O-(4,4-dimethoxytrityloxy)-N2-isobutyryl-2'-deoxyguanosine-3'-(2-cyanoethyl-N,N-diisopropyl)phosphoramidite (i.e., 5'-DMT-dG(iBu)-3'-CE-Phosphoramidite), N4-acetyl-5'-O-(4,4-dimethoxytrityloxy)-2'-deoxycytidine-3'-(2-cyanoethyl-N,N-diisopropyl)phosphoramidite (i.e., 5'-DMT-dC(Ac)-3'-CE-Phosphoramidite), 5'-O-(4,4-dimethoxytrityloxy)-2'-deoxythymidine-3-(2-cyanoethyl-N,N-diisopropyl)phosphoramidite (i.e. 5'-DMT-dT-3'-CE-Phosphoramidite) were chosen as 3' phosphoramidite monomers. The above 3' phosphoramidite monomers were respectively dissolved in anhydrous acetonitrile, to obtain corresponding 0.1 M monomer solutions.

A 3 wt % trichloroacetic acid (i.e., TCA) solution (dichloromethane as a solvent) was chosen as a deprotecting reagent of dimethoxytrityloxy (i.e., DMT).

A 0.25 M solution of 5-ethylthiotetrazole (i.e., ETT) (acetonitrile as a solvent) was chosen as an activator reagent.

A 0.05 M iodine ($I_2$) solution (a mixed solution of pyridine and water in a volume ratio of 9:1 as a solvent) was chosen as an oxidation reagent.

Phenylacetyl disulfide (i.e., PADS) was chosen as a sulfurizing reagent.

A mixed solution of acetic anhydride (Ac2O) and acetonitrile in a volume ratio of 1:4 was chosen as capping reagent A.

A mixed solution of N-methylimidazole, pyridine, and acetonitrile in a volume ratio of 2:3:5 was chosen as capping reagent B.

20 μmol of the foregoing solid support was loaded into a synthesis column, to synthesize from a 3' end to a 5' end according to a target product sequence (3'-TGTTTTCGTTTTGTCCAGATC-5', SEQ ID NO: 16). Synthesis of each base underwent one cycle. Each cycle had the following steps: 1, to the synthesis column adding 2 mL of the foregoing deprotecting reagent for deprotection for 40 s, and then washing system in the synthesis column with acetonitrile; 2, to the synthesis column adding 470 μL of the foregoing activator reagent and 630 μL of a corresponding monomer solution for coupling for 6 min, and then washing the system in the synthesis column with acetonitrile; 3, to the synthesis column adding 1.6 mL of an oxo reagent or 1.6 mL of a thio reagent, and after treating for 3 min, washing the system in the synthesis column with acetonitrile; and 4, to the synthesis column adding the foregoing capping reagent A (1 mL) and capping reagent B (1 mL), and 30 s later, entering a next cycle.

A sequence of the template strand 2 is as follows:

SEQ ID NO: 16
3'-TGTTTTCGTTTTGTCCAGATC-5',.

(8) Ligation Reaction of Nucleotide Strand of Interest:

To a tris buffer solution with a pH of 8.0, containing 400 μM ATP, 2 mM $MgCl_2$, 1 mM DTT, 200 μM template strand 2, 200 μM nucleotide fragment 5 (synthesized in the 3'- to 5'-direction or the 5'-to 3'-direction), 200 μM nucleotide fragment 6 (synthesized in the 3'- to 5'-direction or the 5'- to 3'-direction), and 200 μM nucleotide fragment 7 (synthesized in the 3'- to 5'-direction or the 5'- to 3'-direction), T4 RNA Ligase2 (a final concentration thereof in a reaction solution was 0.5 U/μL) was added, and after 5 h of reaction at 37° C., EDTA (a final concentration thereof in the reaction solution was 3 mM) was added to terminate the reaction, to obtain a synthesized product.

In the above, specific reaction is divided into eight reactions, as shown in Table 12.

TABLE 12

| | Nucleotide Fragment 5 | Nucleotide Fragment 6 | Nucleotide Fragment 7 |
|---|---|---|---|
| Reaction 5 | Synthesis in 3'- to 5'- Direction | Synthesis in 3'- to 5'- Direction | Synthesis in 3'- to 5'- Direction |
| Reaction 6 | Synthesis in 3'- to 5'- Direction | Synthesis in 3'- to 5'- Direction | Synthesis in 5'- to 3'- Direction |
| Reaction 7 | Synthesis in 3'- to 5'- Direction | Synthesis in 5'- to 3'- Direction | Synthesis in 3'- to 5'- Direction |
| Reaction 8 | Synthesis in 3'- to 5'- Direction | Synthesis in 5'- to 3'- Direction | Synthesis in 5'- to 3'- Direction |
| Reaction 9 | Synthesis in 5'- to 3'- Direction | Synthesis in 3'- to 5'- Direction | Synthesis in 3'- to 5'- Direction |
| Reaction 10 | Synthesis in 5'- to 3'- Direction | Synthesis in 3'- to 5'- Direction | Synthesis in 5'- to 3'- Direction |
| Reaction 11 | Synthesis in 5'- to 3'- Direction | Synthesis in 5'- to 3'- Direction | Synthesis in 3'- to 5'- Direction |
| Reaction 12 | Synthesis in 5'- to 3'- Direction | Synthesis in 5'- to 3'- Direction | Synthesis in 5'- to 3'- Direction |

Example 3

The present example provides a method for synthesizing one or more nucleotide strands of interest, including the following steps:

(1) Synthesis of a Nucleotide Fragment 8 in a 3'- to 5'-Direction:

A synthesis step is the same as step (1) in Example 1, and a synthesized product obtained is as shown in Table 13.

TABLE 13

| Target Product | 5'-pmUmUmUmUmGmUGalNAc-3' |
| --- | --- |
| n-1 Impurity | 5'-mUmUmUmGmUGalNAc-3' |
| n-2 Impurity | 5'-mUmUmGmUGalNAc-3' |
| n-3 Impurity | 5'-mUmGmUGalNAc-3' |

In Table 13, m represents 2'ome modification, i.e., 2' position on nucleoside sugar is modified by methoxy; p represents a phosphate group; and GalNAc represents N-acetylgalactosamine.

(2) Synthesis of the Nucleotide Fragment 8 Synthesized in a 5'- to 3'-Direction:

A synthesis step is the same as step (2) in Example 1, and a synthesized product obtained is as shown in Table 14.

TABLE 14

| Target Product | 5'-pmUmUmUmUmGmUGalNAc-3' |
| --- | --- |
| n-1 Impurity | 5'-pmUmUmUmUmGmU-3' |
| n-2 Impurity | 5'-pmUmUmUmUmG-3' |
| n-3 Impurity | 5'-pmUmUmUmU-3' |

In Table 14, m represents 2'ome modification, i.e., 2' position on nucleoside sugar is modified by methoxy; p represents a phosphate group; and GalNAc represents N-acetylgalactosamine.

(3) Synthesis of a Nucleotide Fragment 9 Synthesized in the 3'- to 5'-Direction:

A synthesis step is the same as step (1) in Example 1, and a synthesized product obtained is as shown in Table 15.

TABLE 15

| Target Product | 5'-mC*mU*mAmGmAmCfCmUfGmUdTmUmUmGmC-3', SEQ ID NO: 17 |
| --- | --- |
| n-1 Impurity | 5'-mU*mAmGmAmCfCmUfGmUdTmUmUmGmC-3', SEQ ID NO: 18 |
| n-2 Impurity | 5'-mAmGmAmCfCmUfGmUdTmUmUmGmC-3', SEQ ID NO: 19 |
| n-3 Impurity | 5'-mGmAmCfCmUfGmUdTmUmUmGmC-3', SEQ ID NO: 20 |

In Table 15, m represents 2'ome modification, i.e., 2' position on nucleoside sugar is modified by methoxy; * represents a phosphorothioate; d represents deoxynucleoside, i.e., the 2' position on the nucleoside sugar is hydrogen, and f represents 2'F modification, i.e., the 2' position on the nucleoside sugar is modified by fluorine.

(4) Synthesis of the Nucleotide Fragment 9 Synthesized in the 5'- to 3'-Direction:

A synthesis step is the same as step (2) in Example 1, and a synthesized product obtained is as shown in Table 16.

TABLE 16

| Target Product | 5'-mC*mU*mAmGmAmCfCmUfGmUdTmUmUmGmC-3', SEQ ID NO: 17 |
| --- | --- |
| n-1 Impurity | 5'-mC*mU*mAmGmAmCfCmUfGmUdTmUmUmG-3', SEQ ID NO: 21 |
| n-2 Impurity | 5'-mC*mU*mAmGmAmCfCmUfGmUdTmUmU-3', SEQ ID NO: 22 |
| n-3 Impurity | 5'-mC*mU*mAmGmAmCfCmUfGmUdTmU-3', SEQ ID NO: 23 |

In Table 16, m represents 2'ome modification, i.e., 2' position on nucleoside sugar is modified by methoxy; * represents a phosphorothioate; d represents deoxynucleoside, i.e., the 2' position on the nucleoside sugar is hydrogen, and f represents 2'F modification, i.e., the 2' position on the nucleoside sugar is modified by fluorine.

(5) Ligation Reaction of Nucleotide Strand of Interest:

To a tris buffer solution with a pH of 8.0, containing 400 µM ATP, 2 mM MgCl$_2$, 1 mM DTT, 100 µM nucleotide fragment 5 prepared in Example 2 (synthesized in the 3'- to 5'-direction or the 5'- to 3'-direction), 100 µM nucleotide fragment 6 prepared in Example 2 (synthesized in the 3'- to 5'-direction or the 5'- to 3'-direction), 100 µM nucleotide fragment 7 prepared in Example 2 (synthesized in the 3'- to 5'-direction or the 5'- to 3'-direction), 100 µM nucleotide fragment 8 prepared (synthesized in the 3'- to 5'-direction or the 5'- to 3'-direction), and 100 µM nucleotide fragment 9 (synthesized in the 3'- to 5'-direction or the 5'- to 3'-direction), T4 RNA Ligase2 (a final concentration thereof in a reaction solution was 0.4 U/µL) was added, and after 4 h of reaction at 37° C., EDTA (a final concentration thereof in the reaction solution was 3 mM) was added to terminate the reaction, to obtain a synthesized product.

In the above, specific reaction is divided into eight reactions, as shown in Table 17.

TABLE 17

| | Nucleotide Fragment 8 | Nucleotide Fragment 9 | Nucleotide Fragment 5 | Nucleotide Fragment 6 | Nucleotide Fragment 7 |
|---|---|---|---|---|---|
| Reaction 13 | Synthesis in 3'- to 5'- Direction | Synthesis in 3'- to 5' - Direction | Synthesis in 5'- to 3'- Direction | Synthesis in 3'- to 5'- Direction | Synthesis in 3'- to 5'- Direction |
| Reaction 14 | Synthesis in 3'- to 5'- Direction | Synthesis in 5'- to 3'- Direction | Synthesis in 5'- to 3'- Direction | Synthesis in 3'- to 5'- Direction | Synthesis in 3'- to 5'- Direction |
| Reaction 15 | Synthesis in 5'- to 3'- Direction | Synthesis in 3'- to 5'- Direction | Synthesis in 5'- to 3'- Direction | Synthesis in 5'- to 3'- Direction | Synthesis in 3'- to 5'- Direction |
| Reaction 16 | Synthesis in 5'- to 3'- Direction | Synthesis in 5'- to 3'- Direction | Synthesis in 5'- to 3'- Direction | Synthesis in 5'- to 3'- Direction | Synthesis in 3'- to 5'- Direction |
| Reaction 17 | Synthesis in 3'- to 5'- Direction | Synthesis in 5'- to 3'- Direction | Synthesis in 3'- to 5'- Direction | Synthesis in 3'- to 5'- Direction | Synthesis in 5'- to 3'- Direction |
| Reaction 18 | Synthesis in 3'- to 5'- Direction | Synthesis in 5'- to 3'- Direction | Synthesis in 3'- to 5' - Direction | Synthesis in 3'- to 5'- Direction | Synthesis in 5'- to 3'- Direction |
| Reaction 19 | Synthesis in 5'- to 3'- Direction | Synthesis in 3'- to 5'- Direction | Synthesis in 3'- to 5'- Direction | Synthesis in 5'- to 3'- Direction | Synthesis in 5'- to 3' - Direction |
| Reaction 20 | Synthesis in 5'- to 3'- Direction | Synthesis in 5'- to 3'- Direction | Synthesis in 3'- to 5'- Direction | Synthesis in 5'- to 3'- Direction | Synthesis in 5'- to 3'- Direction |

Experimental Example 1

The synthesized products corresponding to four reactions performed in Table 5 of Example 1 were analyzed by LC-MS, and analysis results are as shown in Table 18.

TABLE 18

| | Nucleotide Fragment 1 | Nucleotide Fragment 2 | Contents of n-1 Impurity, n-2 Impurity, and n-3 Impurity in Synthesized product by LC-MS Analysis |
|---|---|---|---|
| Reaction 1 | Synthesis in 3'- to 5'- Direction | Synthesis in 3'- to 5'- Direction | n-1 Impurity: 3.0% n-2 Impurity: 1.7% n-3 Impurity: 1.3% |
| Reaction 2 | Synthesis in 3'- to 5'- Direction | Synthesis in 5'- to 3'- Direction | n-1 Impurity: 4.7% n-2 Impurity: 2.4% n-3 Impurity: 2.1% |
| Reaction 3 | Synthesis in 5'- to 3'- Direction | Synthesis in 3'- to 5'- Direction | n-1 Impurity: 0.05% n-2 Impurity: 0.02% n-3 Impurity: 0% |

TABLE 18-continued

| | Nucleotide Fragment 1 | Nucleotide Fragment 2 | Contents of n-1 Impurity, n-2 Impurity, and n-3 Impurity in Synthesized product by LC-MS Analysis |
|---|---|---|---|
| Reaction 4 | Synthesis in 5'- to 3'- Direction | Synthesis in 5'- to 3'- Direction | n-1 Impurity: 1.9% n-2 Impurity: 0.8% n-3 Impurity: 0.4% |

It can be seen from Table 18 that the contents of the n−1 impurity, the n−2 impurity, and the n−3 impurity in the synthesized product corresponding to the reaction 3 are the lowest. It indicates that, when the nucleotide fragment 1 containing the 3'-hydroxyl group is synthesized in the 5'- to 3'-direction and the nucleotide fragment 2 containing the 5'-phosphate group is synthesized in the 3'-to 5'-direction, the content of impurities in the synthesized product of the nucleotide strands can be effectively reduced.

Experimental Example 2

The synthesized products corresponding to eight reactions performed in Table 12 of Example 2 were analyzed by LC-MS, and analysis results are as shown in Table 19.

TABLE 19

| | Nucleotide Fragment 5 | Nucleotide Fragment 6 | Nucleotide Fragment 7 | Contents of n-1 Impurity, n-2 Impurity, and n-3 Impurity in Synthesized product by LC-MS Analysis |
|---|---|---|---|---|
| Reaction 5 | Synthesis in 3'- to 5'- Direction | Synthesis in 3 - to 5'- Direction | Synthesis in 3'- to 5'- Direction | n-1 Impurity: 1.3% n-2 Impurity: 0.9% n-3 Impurity: 0.5% |
| Reaction 6 | Synthesis in 3'- to 5'- Direction | Synthesis in 3'- to 5'- Direction | Synthesis in 5'- to 3'- Direction | n-1 Impurity: 2.6% n-2 Impurity: 2.3% n-3 Impurity: 1.5% |

TABLE 19-continued

| | Nucleotide Fragment 5 | Nucleotide Fragment 6 | Nucleotide Fragment 7 | Contents of n-1 Impurity, n-2 Impurity, and n-3 Impurity in Synthesized product by LC-MS Analysis |
|---|---|---|---|---|
| Reaction 7 | Synthesis in 3'- to 5'- Direction | Synthesis in 5'- to 3'- Direction | Synthesis in 3'- to 5'- Direction | n-1 Impurity: 1.2% n-2 Impurity: 1.1% n-3 Impurity: 0.7% |
| Reaction 8 | Synthesis in 3'- to 5'- Direction | Synthesis in 5'- to 3'- Direction | Synthesis in 5'- to 3'- Direction | n-1 Impurity: 2.3% n-2 Impurity: 2.2% n-3 Impurity: 1.8% |
| Reaction 9 | Synthesis in 5'- to 3'- Direction | Synthesis in 3'- to 5'- Direction | Synthesis in 3'- to 5'- Direction | n-1 Impurity: 0% n-2 Impurity: 0% n-3 Impurity: 0% |
| Reaction 10 | Synthesis in 5'- to 3'- Direction | Synthesis in 3'- to 5'- Direction | Synthesis in 5'- to 3'- Direction | n-1 Impurity: 1.6% n-2 Impurity: 1.2% n-3 Impurity: 0.6% |
| Reaction 11 | Synthesis in 5'- to 3'- Direction | Synthesis in 5'- to 3'- Direction | Synthesis in 3'- to 5'- Direction | n-1 Impurity: 0% n-2 Impurity: 0% n-3 Impurity: 0% |
| Reaction 12 | Synthesis in 5'- to 3'- Direction | Synthesis in 5'- to 3'- Direction | Synthesis in 5'- to 3'- Direction | n-1 Impurity: 1.7% n-2 Impurity: 1.3% n-3 Impurity: 0.8% |

It can be seen from Table 19 that the contents of the n−1 impurity, the n−2 impurity, and the n−3 impurity in the synthesized products corresponding to the reaction 9 and the reaction 11 are the lowest. It indicates that, when the nucleotide fragment 5 containing the 3'-hydroxyl group is synthesized in the 5'- to 3'-direction and the nucleotide fragment 7 containing the 5'-phosphate group is synthesized in the 3'- to 5'-direction, the content of impurities in the synthesized products of the nucleotide strands can be effectively reduced.

Experimental Example 3

The synthesized products corresponding to eight reactions performed in Table 17 of Example 3 were analyzed by LC-MS, and analysis results are as shown in Table 20.

TABLE 20

| | Nucleotide Fragment 8 | Nucleotide Fragment 9 | Contents of n-1 Impurity, n-2 Impurity, and n-3 Impurity in Product Synthesized by Nucleotide Fragment 8 and Nucleotide Fragment 9 by LC-MS Analysis | Contents of n-1 Impurity, n-2 Impurity, and n-3 Impurity in Product Synthesized by Nucleotide Fragment 5, Nucleotide Fragment 6, and Nucleotide Fragment 7 by LC-MS Analysis |
|---|---|---|---|---|
| Reaction 13 | Synthesis in 3'- to 5'- Direction | Synthesis in 3'- to 5'- Direction | n-1 Impurity: 1.2% n-2 Impurity: 0.8% n-3 Impurity: 0.3% | n-1 Impurity: 0% n-2 Impurity: 0% n-3 Impurity: 0% |
| Reaction 14 | Synthesis in 3'- to 5'- Direction | Synthesis in 5'- to 3'- Direction | n-1 Impurity: 0% n-2 Impurity: 0% n-3 Impurity: 0% | n-1 Impurity: 0% n-2 Impurity: 0% n-3 Impurity: 0% |
| Reaction 15 | Synthesis in 5'- to 3'- Direction | Synthesis in 3'- to 5'- Direction | n-1 Impurity: 3.3% n-2 Impurity: 2.9% n-3 Impurity: 2.4% | n-1 Impurity: 0% n-2 Impurity: 0% n-3 Impurity: 0% |
| Reaction 16 | Synthesis in 5'- to 3'- Direction | Synthesis in 3'- to 5'- Direction | n-1 Impurity: 2.4% n-2 Impurity: 2.1% n-3 Impurity: 1.8% | n-1 Impurity: 0% n-2 Impurity: 0% n-3 Impurity: 0% |
| Reaction 17 | Synthesis in 3'- to 5'- Direction | Synthesis in 3'- to 5'- Direction | n-1 Impurity: 1.4% n-2 Impurity: 1.0% n-3 Impurity: 0.4% | n-1 Impurity: 2.4% n-2 Impurity: 2.2% n-3 Impurity: 1.3% |
| Reaction 18 | Synthesis in 3'- to 5'- Direction | Synthesis in 5'- to 3'- Direction | n-1 Impurity: 0% n-2 Impurity: 0% n-3 Impurity: 0% | n-1 Impurity: 2.1% n-2 Impurity: 1.8% n-3 Impurity: 1.3% |
| Reaction 19 | Synthesis in 5'- to 3'- Direction | Synthesis in 3'- to 5'- Direction | n-1 Impurity: 3.8% n-2 Impurity: 3.0% n-3 Impurity: 2.6% | n-1 Impurity: 2.7% n-2 Impurity: 2.4% n-3 Impurity: 1.8% |
| Reaction 20 | Synthesis in 5'- to 3'- Direction | Synthesis in 5'- to 3'- Direction | n-1 Impurity: 2.5% n-2 Impurity: 2.2% n-3 Impurity: 1.9% | n-1 Impurity: 2.6% n-2 Impurity: 2.4% n-3 Impurity: 1.5% |

It can be seen from Table 20 that the content of the n−1 impurity, the n−2 impurity, and the n−3 impurity in the synthesized product corresponding to the reaction 14 (i.e., two nucleotide strands of interest, in which one nucleotide strand of interest is a nucleotide strand obtained by linking the nucleotide fragment 8 and the nucleotide fragment 9, and the other nucleotide strand of interest is a nucleotide strand obtained by linking the nucleotide fragment 5, the nucleotide fragment 6, and the nucleotide fragment 7) is the lowest. It indicates that, when "the nucleotide fragment 8 containing the 5'-phosphate group is synthesized in the 3'- to 5'-direction, and the nucleotide fragment 9 containing the 3'-hydroxyl group is synthesized in the 5'- to 3'-direction", and when "the nucleotide fragment 5 containing the 3'-hydroxyl group is synthesized in the 5'- to 3'-direction, and the nucleotide fragment 7 containing the 5'-phosphate group is synthesized in the 3'- to 5'-direction", the content of impurities in the synthesized product of the nucleotide strands of interest that are complementary to each other can be effectively reduced.

In conclusion, the complex for synthesizing a nucleotide strand provided in the present disclosure can greatly reduce the content of the non-target nucleotide strands in the synthesized product of the nucleotide strands, so as to effectively improve the purity of the nucleotide strands of interest in the synthesized product, thereby being beneficial to fully exerting the efficacy of the nucleotide strand of interest.

The examples described above are only some but not all examples of the present disclosure. The detailed descriptions of the examples of the present disclosure are not intended to limit the scope of the present disclosure claimed, but merely illustrate chosen examples of the present disclosure. All of other examples obtained by those ordinarily skilled in the art, based on the examples in the present disclosure, without using any inventive efforts, should fall within the scope of protection of the present disclosure.

What is claimed is:

1. A complex for synthesizing at least one nucleotide strand of interest, comprising: nucleotide fragments and a double-stranded oligonucleotide ligase, wherein the nucleotide fragments are used to form a double-stranded oligonucleotide; the double-stranded oligonucleotide ligase is a ligase capable of sealing nicks in the double-stranded oligonucleotide; and at least one strand of the double-stranded oligonucleotide is a nucleotide strand of interest; and the nucleotide fragments comprise a first fragment and a second fragment, wherein the first fragment contains a 5'-phosphate group, and the first fragment is synthesized in a 3'-to 5'-direction; and the second fragment contains a 3'-hydroxyl group, and the second fragment is synthesized in a 5'-to 3'-direction.

2. The complex according to claim 1, wherein the nucleotide fragments further comprise a third fragment, wherein the third fragment contains a 3'-hydroxyl group, and the third fragment contains a 5'-phosphate group; and optionally, the third fragment is synthesized in a 3'-to 5'-direction; or, the third fragment is synthesized in a 5'-to 3'-direction.

3. The complex according to claim 1, wherein the complex further comprises at least one template strand, the at least one template strand and the nucleotide fragments are hybridized to form the double-stranded oligonucleotide; and the nucleotide fragments are used to form the nucleotide strand of interest.

4. The complex according to claim 3, wherein the template strand is of a straight-stranded structure; the template strand can be reversely complementary to a 5'-sequence of the first fragment, to form a first complementary region; the template strand can be reversely complementary to a 3'-sequence of the second fragment, to form a second complementary region; and a 5' end of the first fragment and a 3' end of the second fragment can form a nick therebetween.

5. The complex according to claim 3, wherein the at least one template strand is of a hairpin structure; the template strand can be reversely complementary to a 5'-sequence of the first fragment, to form a first complementary region; and the template strand can be reversely complementary to a 3'-sequence of the second fragment, to form a second complementary region; and the template strand contains a 5'-phosphate group, and a 5' end of the template strand and a 3' end of the first fragment can form a nick therebetween; or the template strand contains a 3'-hydroxyl group, and a 3' end of the template strand and a 5' end of the second fragment can form a nick therebetween.

6. The complex according to claim 1, wherein the first fragment is of a hairpin structure; the first fragment can be reversely complementary to a 3'-sequence of the second fragment, and a 5' end of the first fragment and a 3' end of the second fragment can form a nick therebetween; and a nucleotide strand that the first fragment links to the second fragment is the nucleotide strand of interest; or the second fragment is of a hairpin structure; the second fragment can be reversely complementary to a 5'-sequence of the first fragment, and a 3' end of the second fragment and a 5' end of the first fragment can form a nick therebetween; and a nucleotide strand that the first fragment links to the second fragment is the nucleotide strand of interest.

7. The complex according to claim 3, wherein the template strand has at least two template fragments, the template fragments are of a straight-stranded structure, and the at least two template fragments can form a nick therebetween;

the template strand can be reversely complementary to a 5'-sequence of the first fragment, to form a first complementary region; the template strand can be reversely complementary to a 3'-sequence of the second fragment, to form a second complementary region; a 5' end of the first fragment and a 3' end of the second fragment form a nick therebetween; and the nucleotide fragments are used to form the nucleotide strand of interest; and optionally, the template fragments comprise a fourth fragment and a fifth fragment; the fourth fragment contains a 5'-phosphate group, and the fourth fragment is synthesized in a 3'-to 5'-direction; the fifth fragment contains a 3'-hydroxyl group, and the fifth fragment is synthesized in a 5'-to 3'-direction; a 5' end of the fourth fragment and a 3' end of the fifth fragment form a nick therebetween; and a 5' end of the first fragment and a 3' end of the second fragment form a nick therebetween.

8. The complex according to claim 1, wherein the nucleotide fragments further comprise a sixth fragment and a seventh fragment; the sixth fragment contains a 5'-phosphate group, and the sixth fragment is synthesized in a 3'-to 5'-direction; and the seventh fragment contains a 3'-hydroxyl group, and the seventh fragment is synthesized in a 5'-to 3'-direction;

a 5' end of the sixth fragment and a 3' end of the seventh fragment form a nick therebetween, and the sixth fragment and the seventh fragment form a first nucleotide strand of interest;

a 5' end of the first fragment and a 3' end of the second fragment form a nick therebetween, and the first fragment and the second fragment form a second nucleotide strand of interest; and the first nucleotide strand of interest and the second nucleotide strand of interest are used to form the double-stranded oligonucleotide.

9. The complex according to claim 2, wherein the nucleotide fragments further comprise a sixth fragment and a seventh fragment; the sixth fragment contains a 5'-phosphate group, and the sixth fragment is synthesized in a 3'-to 5'-direction; and the seventh fragment contains a 3'-hydroxyl group, and the seventh fragment is synthesized in a 5'-to 3'-direction;

a 5' end of the sixth fragment and a 3' end of the seventh fragment form a nick therebetween, and the sixth fragment and the seventh fragment form a first nucleotide strand of interest together;

a 3' end of the third fragment and a 5' end of the first fragment form a nick therebetween, and a 5' end of the third fragment and a 3' end of the second fragment form a nick therebetween; and the first fragment, the third fragment, and the second fragment are used to form a second nucleotide strand of interest together; and the first nucleotide strand of interest and the second nucleotide strand of interest are used to form the double-stranded oligonucleotide together.

10. The complex according to claim 1, wherein when the nucleotide fragments are DNA, the double-stranded oligonucleotide ligase is a DNA double-stranded oligonucleotide ligase; the DNA double-stranded oligonucleotide ligase comprises a T4 DNA ligase; when the nucleotide fragments are RNA, the double-stranded oligonucleotide ligase is an RNA double-stranded oligonucleotide ligase; and the RNA double-stranded oligonucleotide ligase comprises an Rnl2 family ligase and/or an Rnl5 family ligase.

11. The complex according to claim 3, wherein the nucleotide fragments contain a modifying group or is free of modifying group;

or/and, the at least one template strand contains a modifying group or is free of modifying group.

12. The complex according to claim 3, wherein a method for preparing the template strand comprises: performing reactions of synthesizing the template strand according to the sequence of interest, without purification treatment of the synthesized product;

or/and, a method for preparing the nucleotide fragment comprises: performing reactions of synthesizing the nucleotide fragment according to the sequence of interest, without purification treatment of the synthesized product.

13. A method for synthesizing the nucleotide strand of interest, comprising: performing a ligation reaction to synthesize the nucleotide strand of interest by using the complex according to claim 1.

14. The complex according to claim 2, wherein the complex further comprises at least one template strand, the at least one template strand and the nucleotide fragments are hybridized to form the double-stranded oligonucleotide; and the nucleotide fragments are used to form the nucleotide strand of interest.

15. The complex according to claim 2, wherein when the nucleotide fragments are DNA, the double-stranded oligonucleotide ligase is a DNA double-stranded oligonucleotide ligase; the DNA double-stranded oligonucleotide ligase comprises a T4 DNA ligase; when the nucleotide fragments are RNA, the double-stranded oligonucleotide ligase is an RNA double-stranded oligonucleotide ligase; and the RNA double-stranded oligonucleotide ligase comprises an Rnl2 family ligase and an Rnl5 family ligase;

and/or, the nucleotide fragments contain 4~200 bases;

and/or, the complex further comprises a buffer solution containing magnesium ions; and optionally, the nucleotide fragments contain 4~120 bases.

16. The complex according to claim 1, wherein the nucleotide fragments contain 4~200 bases.

17. The complex according to claim 10, wherein the nucleotide fragments contain 4~200 bases.

18. The complex according to claim 1, wherein the complex further comprises a buffer solution containing magnesium ions; and the nucleotide fragments contain 4~120 bases.

19. The complex according to claim 10, wherein the complex further comprises a buffer solution containing magnesium ions; and the nucleotide fragments contain 4~120 bases.

20. The complex according to claim 1, wherein the nucleotide fragments further comprise non-full-length, truncated nucleotide fragments.

* * * * *

```
                           SEQUENCE LISTING

Sequence total quantity: 23
SEQ ID NO: 1            moltype = RNA  length = 49
FEATURE                 Location/Qualifiers
source                  1..49
                        mol_type = other RNA
                        organism = synthetic construct
SEQUENCE: 1
aggatgcgct aagtagcgtg cgttttagta ctctggaaac agaatctac              49

SEQ ID NO: 2            moltype = RNA  length = 48
FEATURE                 Location/Qualifiers
source                  1..48
                        mol_type = other RNA
                        organism = synthetic construct
SEQUENCE: 2
ggatgcgcta agtagcgtgc gttttagtac tctggaaaca gaatctac               48

SEQ ID NO: 3            moltype = RNA  length = 47
FEATURE                 Location/Qualifiers
source                  1..47
                        mol_type = other RNA
                        organism = synthetic construct
SEQUENCE: 3
gatgcgctaa gtagcgtgcg ttttagtact ctggaaacag aatctac                47

SEQ ID NO: 4            moltype = RNA  length = 46
FEATURE                 Location/Qualifiers
source                  1..46
                        mol_type = other RNA
                        organism = synthetic construct
SEQUENCE: 4
atgcgctaag tagcgtgcgt tttagtactc tggaaacaga atctac                 46

SEQ ID NO: 5            moltype = RNA  length = 48
FEATURE                 Location/Qualifiers
source                  1..48
                        mol_type = other RNA
                        organism = synthetic construct
SEQUENCE: 5
aggatgcgct aagtagcgtg cgttttagta ctctggaaac agaatcta               48

SEQ ID NO: 6            moltype = RNA  length = 47
FEATURE                 Location/Qualifiers
source                  1..47
                        mol_type = other RNA
                        organism = synthetic construct
SEQUENCE: 6
aggatgcgct aagtagcgtg cgttttagta ctctggaaac agaatct                47

SEQ ID NO: 7            moltype = RNA  length = 46
FEATURE                 Location/Qualifiers
source                  1..46
                        mol_type = other RNA
```

-continued

```
                          organism = synthetic construct
SEQUENCE: 7
aggatgcgct aagtagcgtg cgttttagta ctctggaaac agaatc            46

SEQ ID NO: 8              moltype = RNA  length = 52
FEATURE                   Location/Qualifiers
source                    1..52
                          mol_type = other RNA
                          organism = synthetic construct
SEQUENCE: 8
taaaacaagg caaaatgccg tgtttatctc gtcaacttgt tggcgagatt tt      52

SEQ ID NO: 9              moltype = RNA  length = 51
FEATURE                   Location/Qualifiers
source                    1..51
                          mol_type = other RNA
                          organism = synthetic construct
SEQUENCE: 9
aaaacaaggc aaaatgccgt gtttatctcg tcaacttgtt ggcgagattt t       51

SEQ ID NO: 10             moltype = RNA  length = 50
FEATURE                   Location/Qualifiers
source                    1..50
                          mol_type = other RNA
                          organism = synthetic construct
SEQUENCE: 10
aaacaaggca aaatgccgtg tttatctcgt caacttgttg gcgagatttt        50

SEQ ID NO: 11             moltype = RNA  length = 49
FEATURE                   Location/Qualifiers
source                    1..49
                          mol_type = other RNA
                          organism = synthetic construct
SEQUENCE: 11
aacaaggcaa aatgccgtgt ttatctcgtc aacttgttgg cgagatttt         49

SEQ ID NO: 12             moltype = RNA  length = 51
FEATURE                   Location/Qualifiers
source                    1..51
                          mol_type = other RNA
                          organism = synthetic construct
SEQUENCE: 12
taaaacaagg caaaatgccg tgtttatctc gtcaacttgt tggcgagatt t       51

SEQ ID NO: 13             moltype = RNA  length = 50
FEATURE                   Location/Qualifiers
source                    1..50
                          mol_type = other RNA
                          organism = synthetic construct
SEQUENCE: 13
taaaacaagg caaaatgccg tgtttatctc gtcaacttgt tggcgagatt        50

SEQ ID NO: 14             moltype = RNA  length = 49
FEATURE                   Location/Qualifiers
source                    1..49
                          mol_type = other RNA
                          organism = synthetic construct
SEQUENCE: 14
taaaacaagg caaaatgccg tgtttatctc gtcaacttgt tggcgagat         49

SEQ ID NO: 15             moltype = DNA  length = 40
FEATURE                   Location/Qualifiers
source                    1..40
                          mol_type = other DNA
                          organism = synthetic construct
SEQUENCE: 15
tgagaccttt gtcttagatg attttgttcc gttttacgga                   40

SEQ ID NO: 16             moltype = DNA  length = 21
FEATURE                   Location/Qualifiers
source                    1..21
                          mol_type = other DNA
                          organism = synthetic construct
SEQUENCE: 16
ctagacctgt tttgcttttg t                                       21

SEQ ID NO: 17             moltype = RNA  length = 15
FEATURE                   Location/Qualifiers
source                    1..15
```

```
                        mol_type = other RNA
                        organism = synthetic construct
SEQUENCE: 17
ctagacctgt tttgc                                                        15

SEQ ID NO: 18           moltype = RNA   length = 14
FEATURE                 Location/Qualifiers
source                  1..14
                        mol_type = other RNA
                        organism = synthetic construct
SEQUENCE: 18
tagacctgtt ttgc                                                         14

SEQ ID NO: 19           moltype = RNA   length = 13
FEATURE                 Location/Qualifiers
source                  1..13
                        mol_type = other RNA
                        organism = synthetic construct
SEQUENCE: 19
agacctgttt tgc                                                          13

SEQ ID NO: 20           moltype = RNA   length = 12
FEATURE                 Location/Qualifiers
source                  1..12
                        mol_type = other RNA
                        organism = synthetic construct
SEQUENCE: 20
gacctgtttt gc                                                           12

SEQ ID NO: 21           moltype = RNA   length = 14
FEATURE                 Location/Qualifiers
source                  1..14
                        mol_type = other RNA
                        organism = synthetic construct
SEQUENCE: 21
ctagacctgt tttg                                                         14

SEQ ID NO: 22           moltype = RNA   length = 13
FEATURE                 Location/Qualifiers
source                  1..13
                        mol_type = other RNA
                        organism = synthetic construct
SEQUENCE: 22
ctagacctgt ttt                                                          13

SEQ ID NO: 23           moltype = RNA   length = 12
FEATURE                 Location/Qualifiers
source                  1..12
                        mol_type = other RNA
                        organism = synthetic construct
SEQUENCE: 23
ctagacctgt tt                                                           12
```